US010313487B2

(12) United States Patent
Edge et al.

(10) Patent No.: US 10,313,487 B2
(45) Date of Patent: Jun. 4, 2019

(54) SUPPORT OF LOCATION SERVICES USING A POSITIONING PROTOCOL

(71) Applicant: QUALCOMM Incorporated, San Diego, CA (US)

(72) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 14/849,460

(22) Filed: Sep. 9, 2015

(65) Prior Publication Data

US 2016/0286009 A1 Sep. 29, 2016

Related U.S. Application Data

(60) Provisional application No. 62/139,467, filed on Mar. 27, 2015.

(51) Int. Cl.
*H04L 29/06* (2006.01)
*H04W 4/02* (2018.01)
(Continued)

(52) U.S. Cl.
CPC .............. *H04L 69/06* (2013.01); *H04L 67/42* (2013.01); *H04W 4/02* (2013.01); *H04W 4/20* (2013.01); *H04W 64/00* (2013.01)

(58) Field of Classification Search
CPC ..... H04L 67/1023; H04L 67/42; G06F 15/16; G06F 17/30353; G06F 17/30371
(Continued)

(56) References Cited

U.S. PATENT DOCUMENTS 3,585,598 A * 6/1971 Hudson, Jr. ......... H04W 88/185 340/7.22
6,978,313 B1 * 12/2005 Pietrowicz ........... H04Q 3/0025 379/221.08

(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 11)", 3GPP Draft; 36355-B60, 3rd Generation Partnership Project (3GPP), Mobile Competence Centre ; 650, Route Des Lucioles ; F-06921 Sophia-Antipolis Cedex ; France Jul. 2, 2014 (Jul. 2, 2014), XP050916214, Retrieved from the Internet: URL: http://www.3gpp.org/ftp/Specs/zltuInfo/M.2012-2/2014-12/Rel-11/36_series/ [retrieved on Jul. 2, 2014].

(Continued)

*Primary Examiner* — Tesfay Yohannes
(74) *Attorney, Agent, or Firm* — Thien T. Nguyen

(57) ABSTRACT

Protocols for location services are disclosed. For example, a method for a positioning protocol for first and second devices may comprise, at the first device: creating a message for the protocol at the first device, where the message comprises a set of included parameters from a plurality of allowed parameters, encoding the message by embedding each of the included parameters in an encoded string, and transmitting the encoded message to the second device. Similarly, a method for such a positioning protocol may comprise, at a second device receiving a message for the protocol transmitted by the first device, where the message comprises the included parameters, with each included parameter embedded in an encoded string, and decoding the message by decoding a subset of the plurality of included parameters and omitting decoding of included parameters that are not in the subset.

17 Claims, 7 Drawing Sheets

100
124
128
126
122
B2
114
118
M2
108
M1
106
130
Location Server
120
B1
112
104
Target Device
B3
116
M3
110

(51) Int. Cl.
*H04W 4/20* (2018.01)
*H04W 64/00* (2009.01)

(58) Field of Classification Search
USPC ............................ 709/206, 230, 238; 378/20
See application file for complete search history.

(56) References Cited

U.S. PATENT DOCUMENTS 7,577,255 B2 * 8/2009 Kerstens ................. H04L 29/06 380/267
8,599,957 B2 * 12/2013 Peake ................... H04L 1/0045 375/295
2008/0298870 A1 * 12/2008 Tsirline .................... G06K 1/12 400/613
2010/0121928 A1 * 5/2010 Leonard .............. H04L 63/1433 709/206
2010/0214166 A1 * 8/2010 Remondi .............. G01S 19/258 342/357.23
2010/0306612 A1 * 12/2010 Tang ................... H03M 13/096 714/752
2011/0234753 A1 * 9/2011 Caramelli ............ H04N 19/597 348/43
2013/0053067 A1 * 2/2013 Aggarwal ............. H04W 64/00 455/456.2
2013/0109405 A1 * 5/2013 Siomina ................ G01S 5/0252 455/456.1
2013/0148778 A1 * 6/2013 Durgan .................. A61B 6/032 378/20
2014/0355692 A1 * 12/2014 Ramasubramonian ...................... H04N 19/597 375/240.26

OTHER PUBLICATIONS

International Search Report and Written Opinion—PCT/US2016/020911—ISA/EPO—dated May 19, 2016.
"LPP Extensions Specification ; OMA-TS-LPPe-V2_0-20141202-C_LPPe_streamline_changes_v01," OMA-TS-LPPE-V2_0-20141202-C_LPPE_Streamline_Changes_V01, Open Mobile Alliance (OMA), 4330 LA Jolla Village Dr., Suite 110 San Diego, CA 92122 ; USA No. 2.0 Dec. 2, 2014 (Dec. 2, 2014), pp. 1-435, XP064186171, Retrieved from the Internet: URL:Public_documents/LOC/2015/ [retrieved onJun. 10, 2015].
"OMA Organization and Processes", Open Mobile Alliance, OMA-Process-V1 1 2-20031028-A, 4330 La Jolla Village Dr., Suite 110 San Diego, CA92122, USA, Oct. 28, 2003, pp. 1-51, XP064126414, URL:ftp/public_documents/OMA_Process_Documents/ [retrieved on Jun. 2, 2004].

* cited by examiner

SUPPORT OF LOCATION SERVICES USING A POSITIONING PROTOCOL

CROSS REFERENCE TO RELATED APPLICATION

This application claims the benefit of U.S. provisional application No. 62/139,467, "Support of Location Services Using A Positioning Protocol," filed Mar. 27, 2015, which is assigned to the assignee hereof. The aforementioned United States provisional patent application is hereby incorporated by reference in its entirety.

FIELD

The present disclosure relates to the field of wireless communications. In particular, the present disclosure relates to positioning protocols for supporting location services.

BACKGROUND

It is often desirable, and sometimes necessary, to know the location or position of a wireless device in a network. For example, a wireless device may place an emergency call in response to an emergency event. It may be desirable to provide the emergency center with an accurate location of the mobile station. In another example, a user may utilize a wireless device to browse through a website and may click on location sensitive content. A web server may then query a home network or a serving network for the position of the wireless device. The network may initiate position processing with the wireless device in order to ascertain the position of the wireless device. The network may then return a position estimate for the wireless device to the web server, which may use this position estimate to provide appropriate content to the user.

Position determination processes, also referred to as location services, may be used to estimate or otherwise determine a location of a device associated with a wireless communication network and/or may make use of a determined location for a mobile device to provide additional services to the user of the mobile device or to an external user or client such as support of direction finding, navigation, locating a friend, colleague or relative or maintaining a location history for a user, an entity or some valuable asset.

In a particular example, a position determination process may be implemented to estimate location coordinates for a mobile device such as a cellular telephone or other like mobile terminal. There are a variety of techniques available to support position determination processes. For example, a Satellite Positioning System (SPS) such as the Global Positioning System (GPS) and/or other like systems may be used to estimate the location of a mobile terminal.

In supporting a position determination process, a location server which may be part of, or accessible from, a wireless network may interact with a mobile device using a positioning protocol such as the Long Term Evolution (LTE) Positioning Protocol (LPP) defined by the 3$^{rd}$ Generation Partnership Project (3GPP) or the LPP Extensions (LPPe) protocol defined by the Open Mobile Alliance (OMA). The positioning protocol may enable one or more positioning methods to be used by the location server and/or by the mobile device to assist or enable location determination of the mobile device. Examples of positioning methods include Assisted GPS (A-GPS), Assisted Global Navigation Satellite System (A-GNSS), Observed Time Difference Of Arrival (OTDOA), Enhanced Cell ID (ECID) and Wireless Local Area Network (WLAN) positioning, to name a few well known examples. When a positioning protocol supports at least several (e.g. three or more) different position methods, as is the case for LPP, or many (e.g. more than a dozen) positioning methods, as is the case for LPPe, the support of the positioning protocol may be complex in a location server and/or in a mobile device, resulting in use of more resources (e.g. memory and processing), more implementation and more testing than in the case of a positioning protocol that is dedicated to supporting only one or two positioning methods. Means to simplify the more complex positioning protocols (e.g. LPP and LPPe) in order to reduce resource usage, implementation and/or testing and to use the resulting positioning protocols to assist or enable location of a mobile device may be of benefit.

SUMMARY

Positioning protocols for supporting location services are disclosed. In one embodiment, a method of supporting location services using a positioning protocol between a first device and a second device may comprise creating a message for the positioning protocol at the first device, where the message comprises a set of included parameters from a plurality of allowed parameters, encoding the message by embedding each of the included parameters in an encoded string, and transmitting the encoded message to the second device.

According to aspects of the present disclosure, each of the plurality of allowed parameters may correspond to a distinct position method or a distinct position function and each of the included parameters may correspond to a position method or a position function that is supported by the first device. The second device may support a subset of the position methods and position functions that correspond to the included parameters and the second device may decode the included parameters corresponding to the subset of supported position methods and position functions and omit decoding of the included parameters corresponding to position methods and position functions that are not supported by the second device.

In some implementations, the encoding of the message is based on abstract syntax notation one (ASN.1). The plurality of allowed parameters may be defined in the message using at least one of an ASN.1 SEQUENCE or an ASN.1 SET. The encoded string within which each included parameter is embedded may comprise at least one of an ASN.1 octet string, an ASN.1 hexadecimal string, an ASN.1 character string, an ASN.1 bit string or an ASN.1 sequence of integers. The encoded strings in the message may all use the same ASN.1 data type (e.g. may all use an octet string). Alternatively, the encoded strings in the message may use different ASN.1 data types: for example, the encoded string in which an included parameter corresponding to a first position method (e.g. A-GNSS) is embedded may be an ASN.1 octet string, whereas the encoded string in which an included parameter corresponding to a second position method (e.g. OTDOA) is embedded may be an ASN.1 bit string. Each encoded string can be an optional ASN.1 parameter in the message. Alternatively, one or more or all encoded strings may be mandatory ASN.1 parameters. In this case, the absence of an included parameter embedded in an encoded string may be indicated by including an encoded string of zero length or unitary length (e.g. containing zero octets or one octet, respectively, in the case of an encoded string that is an ASN.1 octet string). The positioning protocol may comprise the Long Term Evolution (LTE) Positioning Protocol (LPP), the LPP Extensions (LPPe) protocol or a combination of LPP and LPPe. The first device may be a location server (e.g. a SUPL SLP or E-SMLC) and the second device may be a User Equipment (UE), or vice versa.

In another embodiment, an apparatus for supporting location services using a positioning protocol between the apparatus and a second device may comprise one or more processors to create a message for the positioning protocol at the apparatus, where the message comprises a set of included parameters from a plurality of allowed parameters, an encoder and/or the one or more processors to encode the message by embedding each of the included parameters in an encoded string, and a transmitter to transmit the encoded message to the second device.

In yet another embodiment, a method of supporting location services using a positioning protocol between a first device and a second device may comprise receiving a message for the positioning protocol transmitted by the second device, where the message comprises a plurality of included parameters from a plurality of allowed parameters, and where each included parameter is embedded in an encoded string, and decoding the message by decoding a subset of the plurality of included parameters and omitting decoding of included parameters that are not in the subset.

According to aspects of the present disclosure, each of the plurality of allowed parameters may correspond to a distinct position method or distinct position function and each of the plurality of included parameters may correspond to a position method or a position function that is supported by the second device. The subset of the plurality of included parameters may correspond to position methods or position functions that are supported by the first device.

In some implementations, the decoding of the message may be based on abstract syntax notation one (ASN.1). The plurality of allowed parameters can be defined in the message using at least one of an ASN.1 SEQUENCE or an ASN.1 SET. Each encoded string may comprise at least one of an ASN.1 octet string, an ASN.1 hexadecimal string, an ASN.1 character string, an ASN.1 bit string or an ASN.1 sequence of integers. The encoded strings may all use the same ASN.1 data type. Alternatively, the encoded strings in the message may use different ASN.1 data types: for example, the encoded string in which an included parameter corresponding to a first position method (e.g. A-GNSS) is embedded may be an ASN.1 octet string, whereas the encoded string in which an included parameter corresponding to a second position method (e.g. OTDOA) is embedded may be an ASN.1 bit string. Each encoded string can be an optional ASN.1 parameter or a mandatory ASN.1 parameter. In the case of a mandatory ASN.1 parameter, the absence of an included parameter embedded in an encoded string may be indicated by including an encoded string of zero length or unitary length (e.g. containing zero octets or one octet, respectively, in the case of an encoded string that is an ASN.1 octet string). The positioning protocol may comprise the Long Term Evolution (LTE) Position Protocol (LPP), the LPP Extensions (LPPe) protocol or a combination of LPP and LPPe. The first device can be a location server and the second device can be a User Equipment (UE), or vice versa.

In yet another embodiment, an apparatus for supporting location services using a positioning protocol between the apparatus and a second device may comprise a receiver to receive a message for the positioning protocol transmitted by a second device, where the message comprises a plurality of included parameters from a plurality of allowed parameters, and each included parameter is embedded in an encoded string, and a decoder and/or one or more processors to decode the message by decoding a subset of the plurality of included parameters and omitting decoding of included parameters that are not in the subset.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

DESCRIPTION OF EMBODIMENTS

Embodiments for using positioning protocols for supporting location services are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the broadest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

The terms "location", "position", "location estimate" and "position estimate" are considered to be synonymous and are used interchangeably herein to refer to a geographic location (e.g. latitude, longitude and optionally altitude) or a civic location (e.g. a street address or a well-known place name) that may be calculated or otherwise estimated for a wireless device either by the wireless device itself or by some other entity such as a location server. A geographic or civic location may be referred to as "absolute" when corresponding to a fixed point, fixed area or fixed volume (e.g. such as provided by a latitude, longitude and optionally an altitude in the case of a fixed point), and may be referred to as "relative" when expressed as a displacement or offset to an absolute location (e.g. by specifying distances north or south, east or west and optionally above or below a fixed point with a known absolute location).

Figure 1:
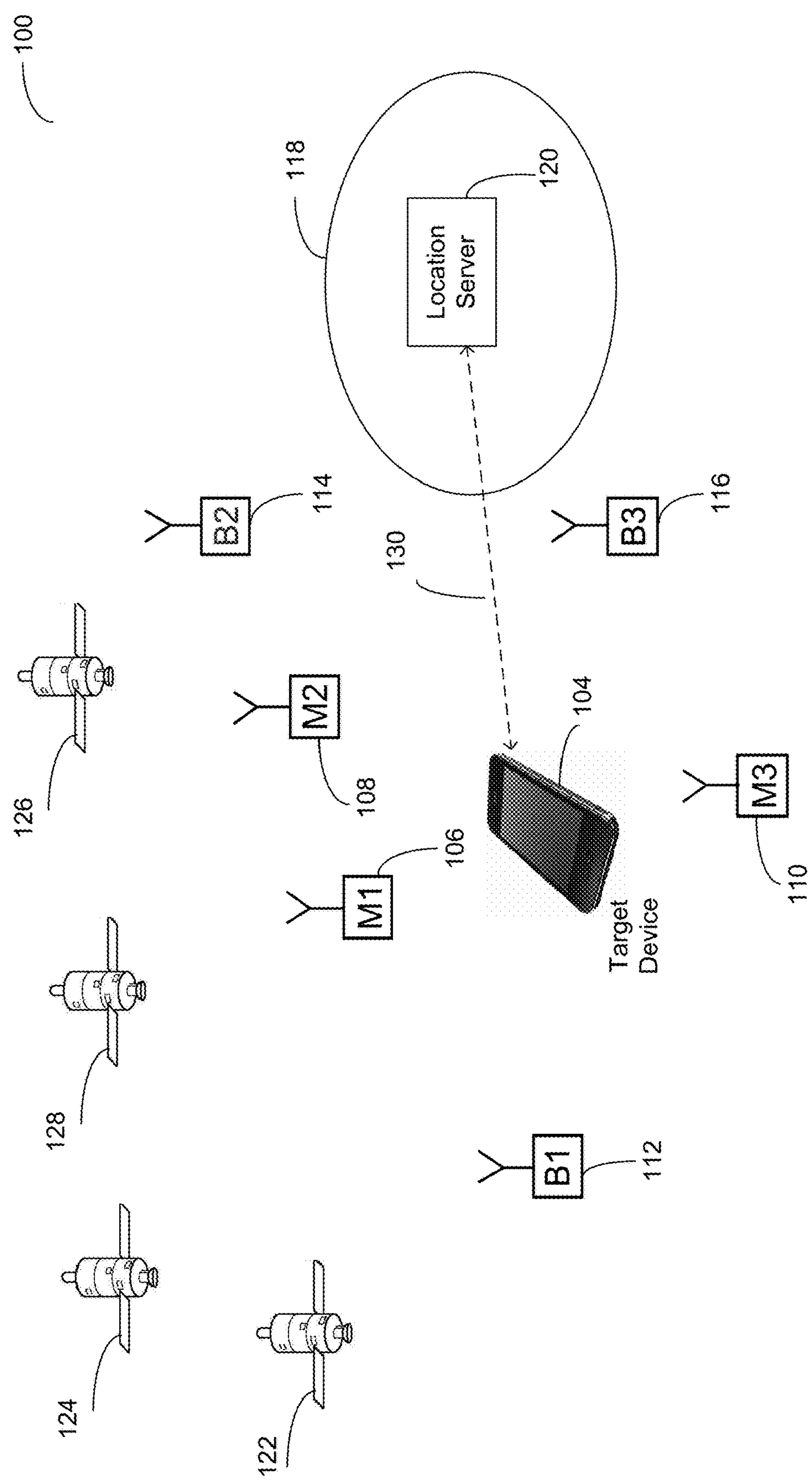
FIG. 1 illustrates an exemplary environment for using positioning protocols to assist determining a location of a mobile device according to aspects of the present disclosure.

FIG. 1 illustrates an exemplary environment 100 for supporting location services using a positioning protocol according to aspects of the present disclosure. In the example shown in FIG. 1, a target device 104 may represent a user's mobile device. According to embodiments of the present disclosure, the target device 104 can include, but not be limited to, a cellular or other wireless communication device (e.g. a cell phone, a smart phone), a personal communication system device, a personal navigation device, a personal information manager, a personal digital assistant, a laptop, a tablet, or other suitable mobile device which is capable of receiving wireless communication and/or navigation signals. Target device 104 may be referred to, interchangeably, as a User Equipment (UE), a Mobile Station (MS), a Mobile Terminal, a Mobile Device, a Wireless Device, a Wireless Terminal, a Station (e.g. an IEEE 802.11 enabled Station), a Secure User Plane Location (SUPL) Enabled Terminal (SET) or by some other name.

In the exemplary environment 100, there are one or more mobile radio beacons M1, M2, and M3, such as mobile access points, denoted as 106, 108, and 110 respectively, in the wireless communication environment and located nearby to the target device 104. Mobile access points may be small and portable (e.g. may be WiFi access points) and while generally fixed, may sometimes be moved to new locations. In addition, there may be one or more fixed radio beacons B1, B2, and B3, such as base stations, denoted as 112, 114, and 116 respectively, located near the target device 104. According to embodiments of the present disclosure, the mobile radio beacons and the fixed radio beacons can be any combinations of base stations, femtocells, Bluetooth® nodes, home base stations, small cells and wireless local area network (WLAN) access points (APs). The mobile and fixed radio beacons may support wireless communication according to such wireless standards as (i) the Global System for Mobile Communications (GSM), Wideband Code Division Multiple Access (WCDMA) or Long Term Evolution (LTE) standards defined by the 3$^{rd}$ Generation Partnership Project (3GPP); (ii) the Code Division Multiple Access (CDMA) 1×RTT and EvDO standards defined by the 3$^{rd}$ Generation Partnership Project 2 (3GPP2); (iii) the 802.11 WiFi or 802.16 WiMax standards defined by IEEE; or (iv) some other standard. The target device 104 may support wireless communication according to the same wireless standards as supported by all of or some of the mobile and fixed radio beacons. Additionally, the target device 104 can be configured to acquire and measure downlink signals for the wireless standards that are supported by the target device 104 and that are received from the mobile and/or fixed radio beacons. Examples of signal measurements that may be supported by the target device 104 include measurements of signal strength, signal quality (e.g. signal to noise ratio (S/N)), signal round trip propagation time (RTT), signal time of arrival (TOA) and signal time difference of arrival (TDOA). Target device 104 may also be configured to measure signals received from satellites 122, 124, 126, and 128 that may be part of a Global Navigation Satellite System (GNSS) such as the United States Global Positioning System (GPS), the Russian GLONASS system, the European Galileo system or the Chinese Beidou system. Examples of measurements made by target device 104 for satellite signals may include measurements of pseudorange, code phase, carrier phase and/or Doppler.

Exemplary environment 100 may include a network 118 that provides communication services for target device 104. Network 118 may be a serving wireless network for target device 104. Network 118 may further or instead be a home network for target device 104 and may be owned and operated by an operator for which the user of target device 104 has a subscription. Alternatively, network 118 may be a visited network but not a home network for target device 104 and may provide communication services for target device 104 when out of coverage of the home network for target device 104. Network 118 may be a wireless network and may support GSM, WCDMA, LTE, CDMA 1×RTT, CDMA EvDO, WiFi, WiMax and/or some other wireless technology. Network 118 may also be a wireline network (e.g. may support DSL or packet cable access). Some or all of mobile radio beacons 106, 108, 110 and fixed radio beacons 112, 114, 116 may be part of network 118 or part of some other network not shown in FIG. 1. In the case when mobile radio beacons 106, 108, 110 are part of network 118, backhaul signaling and data/voice transport with the rest of network 118 may be accomplished by wireless means (e.g. microwave, satellite as well as the wireless technology supported by fixed base stations belonging to network 118).

Target device 104 may be in communication with a location server 120 that is part of or attached to the network 118 or that is accessible from the network 118 (e.g. is part of the home network for target device 104 in the case that network 118 is a visited but not a home network for target device 104). Location server 120 may be a Serving Mobile Location Center (SMLC), a Standalone SMLC (SAS) or an Enhanced Serving Mobile Location Center (E-SMLC) as defined by 3GPP. Location server 120 may also be a Secure User Plane Location (SUPL) Location Platform (SLP) defined by the Open Mobile Alliance (OMA) or a Position Determining Entity (PDE) defined by 3GPP2. Location server 120 may support location services on behalf of target device 104. For example, location server 120 may provide assistance data to target device 104—e.g. assistance data to (i) help target device 104 acquire and measure signals from the mobile radio beacons 106, 108, 110, the fixed radio beacons 112, 114, 116 and/or satellites 122, 124, 126, 128 and/or assistance data to (ii) help target device 104 compute its location from these measurements. Location server 120 may also receive (e.g. and request) measurements or a location estimate from target device 104 and may determine a location for target device 104 using any measurements received. Location server 120 and target device 104 may also receive (e.g. and request) the positioning capabilities of one another—e.g. capabilities to send or receive different types of assistance data, different types of location related measurements and to support different position methods. Target device 104 and location server 120 may employ a positioning protocol 130 to communicate location related information such as (i) conveying assistance data from location server 120 to target device 104, (ii) conveying a request for assistance data from target device 104 to location server 120, (iii) conveying measurements or a location estimate from target device 104 to location server 120, (iv) conveying a request for measurements or a location estimate from location server 120 to target device 104, (v) conveying positioning capabilities from either of location server 120 or target device 104 to the other entity and/or (vi) conveying a request for positioning capabilities from either of location server 120 or target device 104 to the other entity. The positioning protocol employed by target device 104 and location server 120 may further define the content, format and encoding for any location related information that is communicated using the positioning protocol (e.g. may define ASN.1 or XML message and parameter content and encoding), the means of transporting location related information (e.g. such as via IP or TCP/IP), and/or the procedures and positioning methods supported by the positioning protocol. For example, positioning protocol procedures may define the types of location information that may or may not be communicated using the positioning protocol for different position methods, how received location information may or must be treated, when particular location information may or must be sent and how error conditions and other abnormalities may or must be treated.

Examples of the positioning protocol 130 may be (i) the LTE Positioning Protocol (LPP) defined by 3GPP in 3GPP Technical Specification (TS) 36.355, (ii) the LPP Extensions (LPPe) protocol defined by OMA in OMA TSs OMA-TS-LPPe-V1_0, OMA-TS-LPPe-V1_1 and OMA-TS-LPPe-V2_0, (iii) both LPP and LPPe combined, and (iv) the Radio Resource Location Services Protocol (RRLP) defined in 3GPP TS 44.031.

Location server 120 may include a database with information on satellites 122, 124, 126, 128 (e.g. ephemeris, almanac and timing data), on mobile radio beacons 106, 108, 110 and/or fixed radio beacons 112, 114, 116 (e.g. location coordinates of fixed radio beacons, location coordinates of mobile radio beacons, antenna characteristics, transmission power, transmission timing relative to other radio beacons or relative to satellites 122, 124, 126, 128). Location server 120 may be configured to provide some of this information (e.g. information for nearby radio beacons) to target device 104 as assistance data using positioning protocol 130—e.g. on request by target device 104 or when location server 120 needs to obtain the location of target device 104 on behalf of some external client (not shown in FIG. 1).

Location server 120 and target device 104 may use positioning protocol 130 as part of a control plane solution for determining location or assisting location determination or as part of a user plane location solution. In a control plane solution, signaling such as that conveyed by positioning protocol 130 is typically conveyed using protocols and interfaces supported by a network (e.g. network 118) that are defined to support signaling rather than data or voice traffic. In a user plane solution, signaling such as that conveyed by positioning protocol 130 is typically conveyed by protocols and resources (e.g. TCP or TCP/IP) intended to convey data and/or voice traffic. Examples of a control plane location solution are the 3GPP solutions defined in 3GPP TSs 23.271, 43.059, 25.305 and 36.305. An example of a user plane solution is the SUPL solution defined by OMA. In the case of a control plane solution, location server 120 may be an SMLC, E-SMLC, SAS or PDE. In the case of a user plane solution, location server may be an SLP such as a home SLP (H-SLP), Discovered SLP (D-SLP) or Emergency SLP (E-SLP).

Target device 104 may access location server 120 via base stations, home base stations or WLAN APs belonging to network 118 or belonging to some other network (not shown in FIG. 1). These base stations, home base stations and WLAN APs may or may not include mobile radio beacons 106, 108, 110 and fixed radio beacons 112, 114, 116.

According to embodiments of the present disclosure, a system can be configured to determine the position or assist in determining the position of the target device 104. In one approach, the position of the target device can be determined using measurements made by the target device 104 of the radio signals transmitted from the mobile radio beacons M1, M2, and M3 and/or from the fixed radio beacons B1, B2 and B3. The measurements may include signal strength, signal quality (e.g. S/N), signal propagation delay (e.g. RTT) or signal timing including absolute timing (e.g. TOA) and relative timing of one radio beacon versus another (e.g. TDOA). The target device 104 may compute a location estimate from these measurements or provide the measurements to location server 120 to compute a location estimate (e.g. using positioning protocol 130). Existing terrestrial based position methods may be used to determine the location of target device 104—e.g. the Observed Time Difference of Arrival (OTDOA) position method defined by 3GPP for LTE radio access in 3GPP TS 36.355, OTDOA defined by 3GPP for WCDMA radio access in 3GPP TS 25.331, the Advanced Forward Link Trilateration (AFLT) method defined by 3GPP2 for CDMA 1× and EvDO radio access in 3GPP2 TS C.S0022, the WLAN positioning method defined by OMA in association with the LPPe positioning protocol for WiFi radio access, and the Enhanced Cell ID (ECID) methods defined by 3GPP and OMA for various wireless access types in association with the LPP and LPPe positioning protocols.

Target device 104 may also employ sensors to detect change of location and/or velocity, acceleration or other location related parameters such as air pressure and/or temperature. Target device 104 or location server 120 may make use of these sensor measurements to determine a new absolute location for target device 104 or a relative location based on a previous known absolute location (e.g. as obtained from previous measurements of mobile radio beacons M1, M2 and M3 and/or fixed radio beacons B1, B2 and B3). In addition, the position of the target device 104 may be determined using measurements made by target device 104 of radio signals from satellites 122, 124, 126, and 128. Target device 104 and location server 120 may also support other position methods (e.g. using the LPPe positioning protocol) such as short range node (SRN) positioning (e.g. using Bluetooth beacons), pedestrian dead reckoning (PDR) Enhanced Observed Time Difference (E-OTD), and/or image recognition based (IRB) positioning. Furthermore, in the case of some positioning methods such as WLAN or SRN positioning, location server 120 may provide one or more radio heat maps as assistance data to target device 104 using positioning protocol 130 containing the expected (e.g. calculated or previously measured) signal strengths or round trip signal propagation times for one or more of mobile radio beacons 106-110 or fixed radio beacons 112-116 at different defined locations such as locations spaced apart by one or a couple of meters in a rectangular grid which may enable target device 104 to compute its location using a method known as radio pattern matching.

Figure 2:
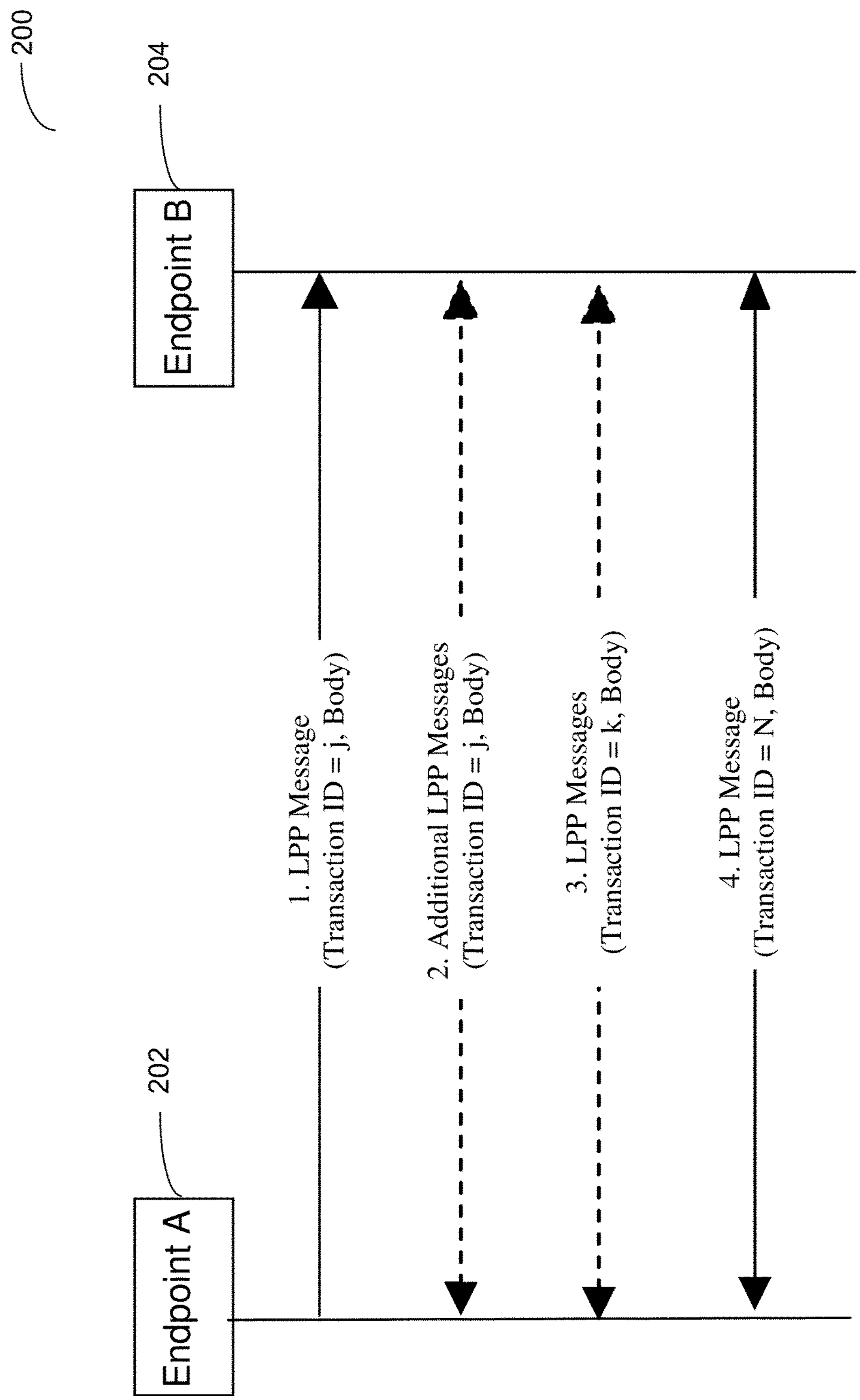
FIG. 2 illustrates exemplary communications according to a positioning protocol between two devices according to aspects of the present disclosure.

FIG. 2 illustrates exemplary communication 200 between two devices using a positioning protocol such as positioning protocol 130 in FIG. 1 according to aspects of the present disclosure. In this example, in step 1, Endpoint A 202, which may be either a target device (e.g. target device 104) or a location server (e.g. location server 120), may initiate a session for the LPP protocol by sending an LPP message for an initial LPP transaction j to Endpoint B 204, which has a complementary role to Endpoint A 202 (e.g. may be a target device such as target device 104 if Endpoint A 202 is a location server). In the optional step 2, Endpoint A 202 and Endpoint B 204 may exchange further LPP messages to continue the transaction started in step 1. In the optional step 3, either endpoint may instigate further transactions by sending additional LPP messages. In step 4, a session may be terminated by a final transaction N in which one or more LPP messages will be exchanged between the two endpoints.

Within each LPP transaction in the communication 200, all constituent LPP messages can include the same transaction identifier. For example, for steps 1 and 2 the transaction identifier may be j whereas for steps 3 and 4, the transaction identifier may be k and N, respectively. The last LPP message sent in each transaction can include an information element indicating the end of the transaction. Transactions that occur in parallel may use different transaction IDs; and transaction IDs for completed transactions may be reused at any time after the final message of a completed transaction is known to have been received.

The communication 200 shown in FIG. 2 may also be valid when each LPP message shown in FIG. 2 is replaced by a combined LPP/LPPe message which may occur in one embodiment if each LPP message shown in FIG. 2 contains an embedded LPPe message. In the case of a combined LPP/LPPe message, reference herein to the content of the message may refer to the content of the LPP message or the content of embedded LPPe message when not otherwise explicitly stated.

The LPP messages shown at steps 1-4 in communication 200 may include any LPP message defined for LPP in 3GPP TS 36.355 such as any of the messages shown later herein in Table 1. Similarly, when an LPP message shown in FIG. 2 is replaced by a combined LPP/LPPe message, the LPP message may be any LPP message shown later in Table 1 and the embedded LPPe message may be an LPPe message corresponding to the LPP message in which it is embedded as described later in association with Table 1.

Figure 3:
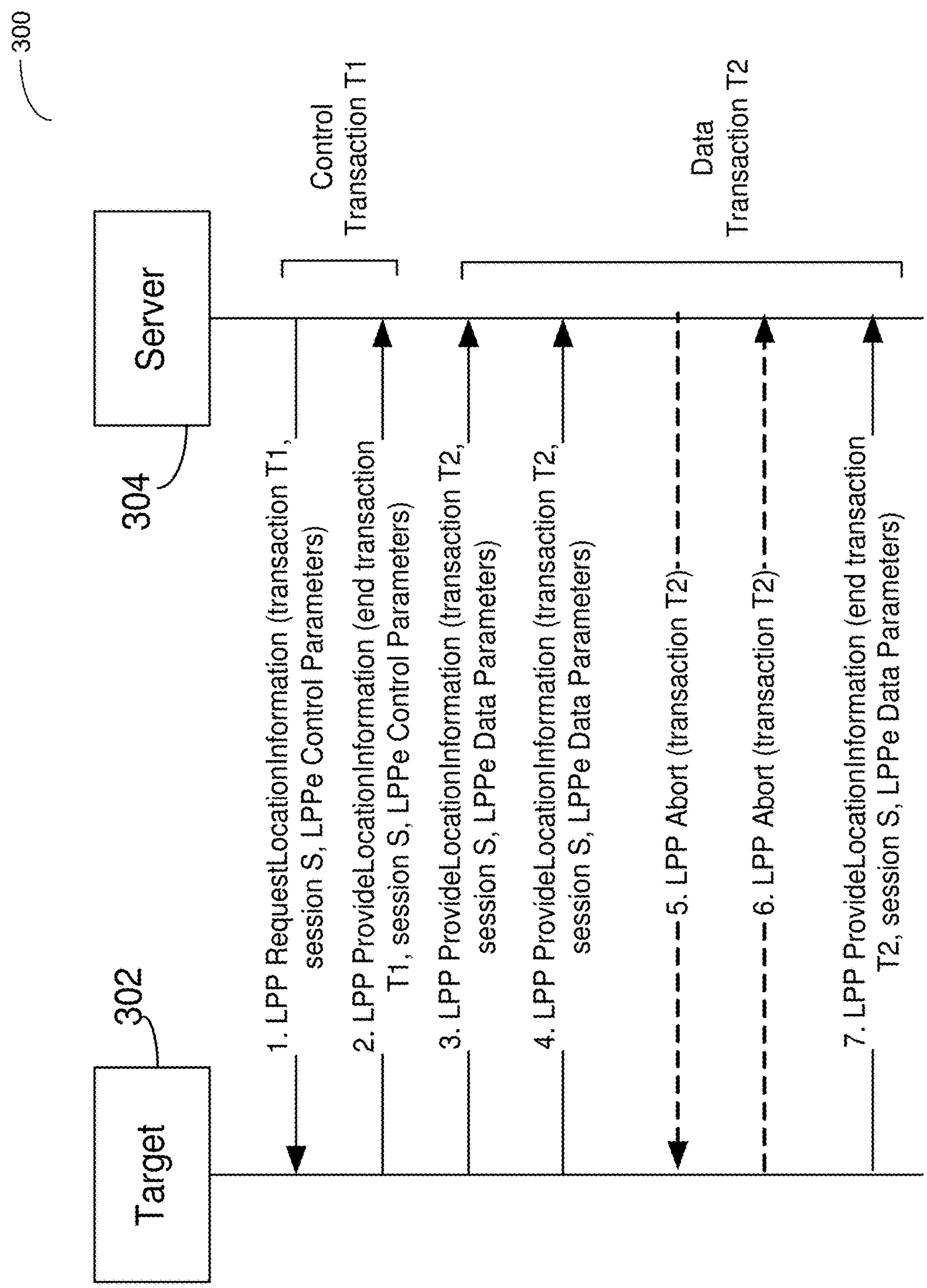
FIG. 3 illustrates another exemplary communications according to a positioning protocol between two devices according to aspects of the present disclosure.

FIG. 3 illustrates another exemplary communication 300 between two devices using a positioning protocol such as positioning protocol 130 in FIG. 1 according to aspects of the present disclosure. In this example, communication between a target device 302 (e.g. the target device 104) and a server 304 (e.g. the location server 120) may occur using the LPP protocol combined with the LPPe protocol. In step 1 of communication 300, the server 304 sends an LPP Request Location Information message containing an embedded LPPe Request Location Information message to the target 302 using some available transaction ID T1. The message in step 1 (e.g. the embedded LPPe message) may contain a periodic/triggered session ID S (e.g. different to any other LPPe periodic/triggered session ID currently in use between the target 302 and server 304), an indication that this is an initial request for a Periodic/Triggered Location Information transfer and LPPe control parameters identifying the type of location information being requested, the triggering or periodicity conditions for sending it and either a duration or other specific conditions for ending the location information transfer.

At step 2, the target 302 may respond by sending an LPP Provide Location Information message to the server 304 containing an embedded LPPe Provide Location Information message. The message at step 2 may use the same transaction ID T1 as used in step 1 and may indicate the end of this transaction. The message (e.g. the embedded LPPe message) for step 2 may contain the periodic/triggered session ID S from step 1, an indication that this is a response to an initial request, and LPPe control parameters indicating whether or not the request in step 1 can be supported. If the request in step 1 can be supported, the LPPe control parameters may explicitly confirm or redefine the type of location information that will be sent in later steps (e.g. steps 3 and 4), the triggering or periodicity parameters for sending the location information and the duration or other conditions for ending the location information transfer. Further characteristics of the location information to be delivered may also be provided. If the procedure cannot be supported, an error reason may be provided at the LPPe level in step 2 and remaining steps may then not be performed.

When the first triggering or periodicity condition confirmed or defined at step 2 occurs, the target 302 may send an unsolicited LPP Provide Location Information message containing an embedded LPPe Provide Location Information message to the server 304 at step 3. The message (e.g. the embedded LPPe message) may contain the periodic/triggered session ID S from step 1, an indication that this is a periodic/triggered location information delivery, and LPPe data parameters containing the type of location information confirmed or defined in step 2. The message may use some available transaction ID T2 that may be different to T1.

At step 4, the target 302 may continue to send further LPP Provide Location Information messages to the server 304, similarly to step 3, containing the type of location information confirmed or redefined in step 2 when each additional triggering or periodicity condition occurs.

At step 5 which an optional step, if an error condition occurs at the server 304 that requires the session to end, the server 304 may send an LPP Abort to the target 302 for the transaction T2 of steps 3 and 4 that may optionally include LPP and/or LPPe error codes. The remaining steps may then be omitted. Error conditions that may induce an abort at step 5 may include an attempt by either the server 304 or target 302 to update the location information transfer, where the final control parameters provided by the target 302 are not acceptable to the server 304.

At step 6 which is an optional step, if an error condition occurs at the target 302 that requires the session to end without the delivery of further location information, the target 302 may send an LPP Abort to the server 304 for transaction T2 of steps 3 and 4 that may optionally include LPP and/or LPPe error codes. The remaining steps may then be omitted.

At step 7, when the duration or other conditions for ending the location information transfer occur, the last LPP Provide Location Information message transferred by the target 302 to the server 304 indicates the end of transaction T2 used in steps 3 and 4.

Figure 4:
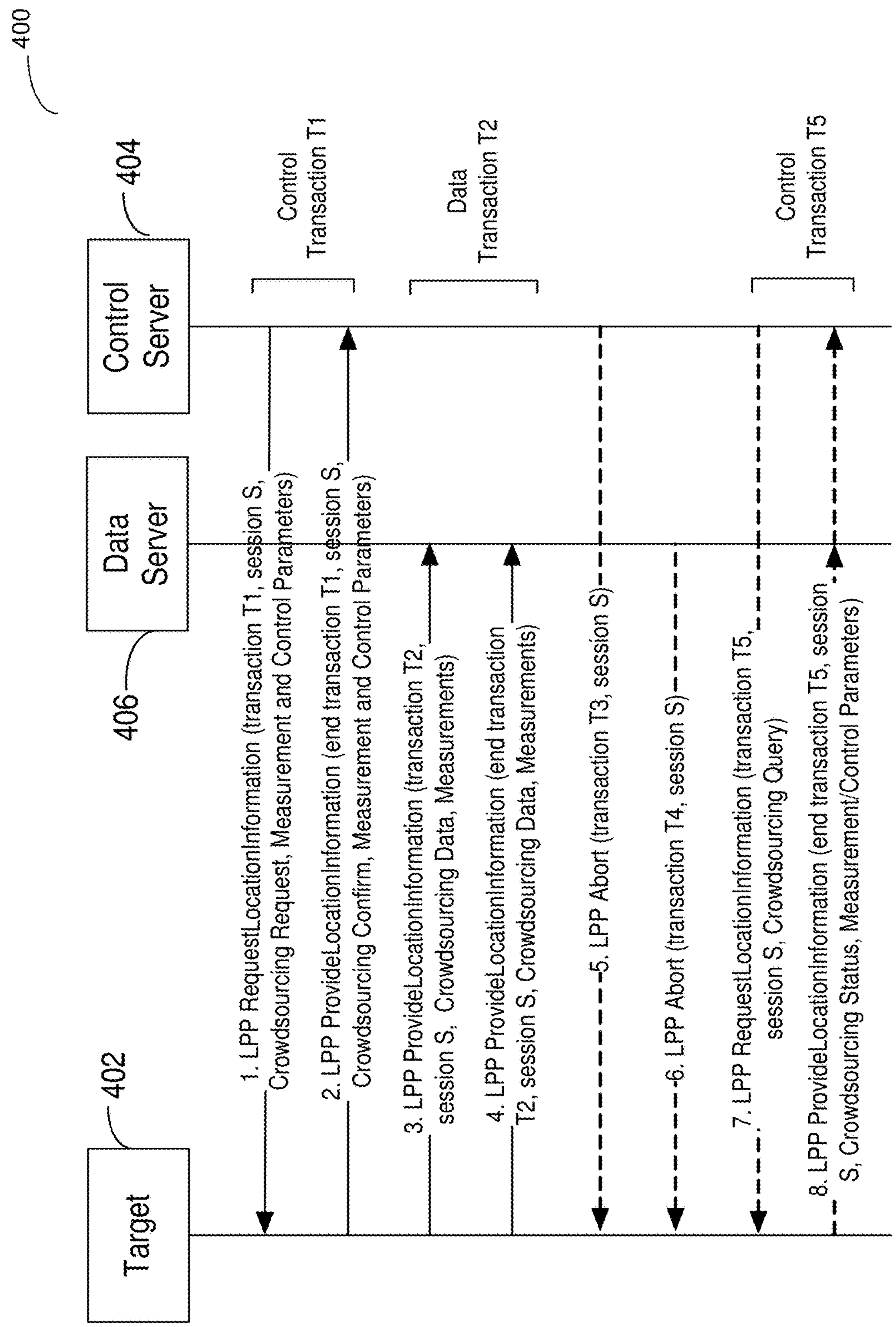
FIG. 4 illustrates yet another exemplary communications according to a positioning protocol between two devices according to aspects of the present disclosure.

FIG. 4 illustrates another exemplary communication 400 between two devices using a positioning protocol such as positioning protocol 130 in FIG. 1 according to aspects of the present disclosure. In this example, communication between a target device 402 (e.g. the target device 104), a control server 404 (e.g. the location server 120), and a data server 406 (e.g. the location server 120 or another location server similar to location server 120) may occur in order to support crowdsourcing of location related data by the target device 402 to the data server 406. In step 1 of communication 400, the control server 404 sends an LPP Request Location Information message to the target device 402 containing an embedded LPPe message (e.g. an LPPe Request Location Information message) and using some available transaction ID T1. The message at step 1 (e.g. the embedded LPPe message) may include a crowdsourcing session ID S which may either be unique to the target device 402 or may be set to an anonymous value of zero, an indication that this is a request for crowdsourcing and an indication of the crowdsourcing measurements requested and the control parameters for obtaining and reporting the measurements. The message at step 1 may also include the address of the data server 406 to which crowdsourcing measurements may be sent (e.g. at steps 3 and 4). If the data server 406 is not indicated, the data server 406 may be the same as the control server 404.

In step 2 in communication 400, the target device 402 may respond by sending an LPP Provide Location Information message containing an embedded LPPe message (e.g. an LPPe Provide Location Information message) to the control server 404. The message may use the same transaction ID T1 as in step 1 and may indicate the end of this transaction. The message may include a session ID S which can either be the same as in step 1 or zero to indicate anonymous reporting, an indication that this is a confirmation of crowdsourcing, and an indication of the measurements to be crowdsourced and the control parameters for obtaining and reporting the measurements. The indicated measurements and control parameters in step 2 can either be the same as in step 1 or a subset of those in step 1 where a subset of control parameters omits certain parameters in step 1 and/or includes certain parameters from step 1 indicating a lower frequency and/or lower duration of measurement and/or reporting than in step 1. If the crowdsourcing procedure cannot be supported by the target device 402, an indication of a rejection of crowdsourcing may be included instead in the LPP Provide Location Information message in step 2 as well as an error reason and an indication of measurements and control parameters is not then included. In this case, subsequent steps of communication 400 may not be performed.

In step 3 of communication 400, the target device 402 may obtain crowdsourcing measurements as defined by the control and measurement parameters in step 2. When the first set of measurements needs to be sent as determined by the control parameters in step 2, the target device 402 may assemble the measurement data into one or more LPP Provide Location Information messages each containing an embedded LPPe message (e.g. an embedded LPPe Provide Location Information message). If there is only one message, the target device 402 may skip step 3 and proceed to step 4. Otherwise, the target device 402 sends the first batch of measurement data to the data server 406 at step 3 in an LPP Provide Location Information message containing an embedded LPPe message (e.g. an LPPe Provide Location Information message) which can indicate crowdsourcing data and comprise measurement data obtained at the earliest time(s). The message at step 3 may include an available transaction ID T2 which may differ from T1 used in steps 1 and 2 and may include the session ID S used in step 2. The target device 402 can repeat step 3 to send each successive set of measurement data (e.g. as obtained at progressively later times) and except for the last set of measurement data, in a further LPP Provide Location Information message to the data server 406.

In step 4, for the last set of measurement data, the target device 402 may send an LPP Provide Location Information message containing an embedded LPPe message (e.g. an LPPe Provide Location Information message) to the data server 406 as in step 3 but with an end of transaction also indicated. In addition, the target device 402 may indicate the end of the crowdsourcing session if any duration agreed in step 2 has ended or if the target device 402 may need to end the session for other reasons (e.g. lack of resources or user intervention). Steps 3 and 4 may be repeated at later reporting times to send subsequent sets of measurements as determined by the control parameters in step 2. If a session or connection between the target device 402 and the data server 406 fails or is released while crowdsourcing transfer according to step 3 and 4 is still in progress, the target device 402 can attempt to re-establish the session or connection and resume the transfer. In this case, the target device 402 may not resend any LPP Provide Location Information message that was previously completely sent in step 3 or step 4 even if there was no confirmation of receipt at the transport level but may instead resume sending of LPP/LPPe messages that were not yet sent or not completely sent to the data server 406. This may result in the loss of one LPP/LPPe Provide Location Information message but may avoid undetected message duplication which may occur with anonymous crowdsourcing or where a data server 406 does not maintain a record of crowdsourcing messages that were received from each target device.

In an optional step 5 in communication 400, if an error related condition occurs at the control server 404 that requires the session to end, the control server 404 may send an LPP Abort message containing an embedded LPPe message (e.g. an LPPe Abort message) to the target device 402 using any available transaction ID T3 and may include the session ID S from step 2.

In an optional step 6 in communication 400, if an error related condition occurs at the data server 406 that requires the session to end, the data server 406 may send an LPP Abort message containing an embedded LPPe message (e.g. an LPPe Abort message) to the target device 402 using any available transaction ID T4 and may include the session ID S received in step 3 or step 4.

In an optional step 7 in communication 400, if the control server 404 or data server 406 needs to query the status of crowdsourcing in the target device 402, the control server 404 or data sever 406 may send an LPP Request Location Information message containing an embedded LPPe message (e.g. an LPPe Request Location Information message) to the target device 402 using some available transaction ID T5. The message at step 7 may include a crowdsourcing session ID S (e.g. the session ID S from step 2, step 3 or step 4) if the control server 404 or data server 406 is aware of an active session with the target device 402. Otherwise, the session ID S may be omitted.

In an optional step 8 in communication 400 and in response to step 7, if the target device 402 is able to match an included session ID S in step 7 to an active crowdsourcing session for the sender of the message in step 7 (e.g. the control server 404 or data server 406) or, if that may not be possible, if the target device 402 is able to determine an active crowdsourcing session for this sender with any session ID, the target device 402 may return an LPP Provide Location Information message containing an embedded LPPe message (e.g. an LPPe Provide Location Information message) to the sender (e.g. the control server 404 or data server 406). The message in step 8 may use the transaction ID T5 from step 7 and may indicate the end of this transaction. The message in step 8 may indicate a crowdsourcing status response and may include the session ID S for the active crowdsourcing session with the sender of the message in step 7 (e.g. the control server 404 or data server 406) which may not be the same as the session ID S received in step 7. The message in step 8 may also indicate the measurements being obtained and the control parameters in use as returned in step 2 for the crowdsourcing session indicated in step 8. The message in step 8 can also provide statistics on the crowdsourcing session if available to the target device 402. If the target device 402 is unable to find an active crowdsourcing session for the sender of the message in step 7 (e.g. the control server 404 or the data server 406), the target device 402 may return an LPP Provide Location Information message containing an embedded LPPe message (e.g. an LPPe Provide Location Information message) to the sender of the message in step 7 (e.g. the control server 404 or data server 406) with the transaction ID T5 from step 7, an end of transaction indication, an indication of a crowdsourcing status response and an indication that no active session was found.

In the case of a receiver of an LPP or LPP/LPPe message detecting protocol errors in communication 400 where a transaction indicated by the received LPP/LPPe message is related to crowdsourcing and is still open, the receiver may return an LPP Error message and may consider the transaction as closed. The LPP or LPP/LPPe message that caused the error may be discarded and any request contained in it may be ignored except in the case of an abort or termination request where any ongoing crowdsourcing session may be terminated. Except for the latter case, any crowdsourcing session to which the received LPP or LPP/LPPe message in error may have referred may continue.

As so far described, a positioning protocol such as LPP or LPPe may support a number of different position methods (e.g. A-GNSS, OTDOA, ECID, WLAN, SRN), may define a number of different positioning protocol messages (e.g. in the case of LPP and LPPe, a Request Location Information, Provide Location Information and Abort as in FIGS. 3 and 4) and may define the content, format and encoding of the different messages and message parameters. In the case of the LPP positioning protocol defined in 3GPP TS 36.355, the message types shown in Table 1 are defined:

TABLE 1

| Message Type |
|---|
| LPP Request Capabilities |
| LPP Provide Capabilities |
| LPP Request Assistance Data |
| LPP Provide Assistance Data |
| LPP Request Location Information |
| LPP Provide Location Information |
| LPP Abort |
| LPP Error |

In the case of the LPPe positioning protocol defined by OMA, LPPe message types are defined corresponding to each of those shown in Table 1 for LPP. When LPP and LPPe are used in combination, a combined LPP/LPPe message consists of one of the LPP message types shown in Table 1 containing one embedded LPPe message of the same type. For example, an LPP/LPPe Provide Location Information message, as exemplified in FIGS. 3 and 4, comprises one LPP Provide Location Information message containing one embedded LPPe Provide Location Information message. Similarly, an LPP/LPPe Provide Assistance Data message comprises one LPP Provide Assistance Data message containing one embedded LPPe Provide Assistance Data message. This method of combining LPP and LPPe messages is repeated for the other LPP message types shown in Table 1. Each LPP and LPPe message type may contain separate parameters for each of the position methods and positioning functions being supported by the message. For example, an LPP Provide Location Information message that is sent by a target device (e.g. target device 104) containing measurements for the A-GNSS and OTDOA position methods could include one parameter in the message comprising the A-GNSS measurements and another parameter comprising the OTDOA measurements. Similarly, an LPPe Provide Assistance Data message (which would typically be embedded inside an LPP Provide Assistance Data message) that is sent by a location server (e.g. location server 120) to a target device (e.g. target device 104) to provide assistance data for the A-GNSS, ECID and WLAN position methods could include a first parameter in the message comprising assistance data for A-GNSS, a second parameter comprising assistance data for ECID and a third parameter comprising assistance data for WLAN positioning. It should be noted that the term "parameter" as used herein may refer to a single item of data (e.g. an integer, Boolean, bit string or octet string) or may refer to a collection of data items (e.g. one or more integers, Booleans, bit strings and/or octet strings) that are grouped together and defined as a single unit.

Some of the position methods supported by the LPP positioning protocol are also supported (and extended) by the LPPe positioning protocol. When any of these position methods are supported by a combined LPP/LPPe message, a parameter for each such position method may be present in the LPP message and/or in the LPPe message that is embedded in the LPP message. For example, if a combined LPP/LPPe Provide Assistance Data message is sent by a location server (e.g. location server 120) to a target device (e.g. target device 104) to convey assistance data for A-GNSS, there may be one parameter in the LPP Provide Assistance Data message comprising assistance data for A-GNSS and/or one parameter comprising (e.g. different) assistance data for A-GNSS in the LPPe Provide Assistance Data message that is embedded in the LPP Provide Assistance Data message. Some other position methods supported by the LPPe positioning protocol are not supported by the LPP positioning protocol. Examples of such position methods include WLAN positioning, SRN positioning and sensor positioning. A combined LPP/LPPe message that supports any of these other position methods would contain one parameter for each such other position method in the LPPe message that is embedded in an LPP message but no parameter for each such other position method within the LPP message itself.

Table 2 shows the different positioning methods and positioning functions supported by LPP and LPPe version 2.0 where a "Yes" entry in the table signifies support and a "No" entry signifies lack of support. For example, ECID for UMTS (row 7) is indicated as not supported by LPP but supported by LPPe version 2.0. Note that common positioning (in row 2 of Table 2) refers to information (e.g. assistance data or measurements) that may be provided to supplement information for one or more of the other position methods and/or may be provided independently of the other position methods.

TABLE 2

| Position Method | LPP Support | LPPe 2.0 Support |
|---|---|---|
| Common Positioning | Yes | Yes |
| A-GNSS | Yes | Yes |
| OTDOA for LTE access | Yes | Yes |
| ECID for LTE access | Yes | Yes |
| OTDOA for UMTS | No | Yes |
| ECID for UMTS | No | Yes |
| E-OTD | No | Yes |
| ECID for GSM | No | Yes |
| WLAN | No | Yes |
| WiMax ECID | No | Yes |
| SRN | No | Yes |
| Sensors | No | Yes |
| PDR | No | Yes |
| IRB | No | Yes |
| Broadcast | No | Yes |
| Crowdsourcing | No | Yes |

Table 2 shows that an LPP message (e.g. an LPP Provide Assistance Data message) may contain up to 4 separate parameters to support the first four position methods shown in Table 2. Table 2 also shows that an LPPe message (e.g. an LPPe Provide Location Information) may contain up to 16 separate parameters to support all 16 position methods and positioning functions. However, because some of the position methods and positioning functions shown in Table 2 may not be used in combination with one another, the maximum number of separate parameters in an LPPe message may be less than 16.

Tables 3-6 show the encodings that are defined in the OMA LPPe 2.0 TS for four different types of LPPe message. The encodings are based on Abstract Syntax Notation One (ASN.1). Table 3 shows the encoding of an LPPe Request Assistance Data message; Table 4 shows the encoding for an LPPe Provide Assistance Data message; Table 5 shows the encoding of an LPPe Request Location Information message; and Table 6 shows the encoding of an LPPe Provide Location Information message. Encodings for an LPPe Request Capabilities message and an LPPe Provide Capabilities message (not shown) follow a similar pattern to the encodings shown in Tables 3-6. Encodings for an LPPe Abort message and LPPe Error message (also not shown) are simpler than the encodings shown in Tables 3-6 since these two messages contain fewer parameters. Note that for ASN.1 encoding, ASN.1 parameter names appear on the left on each line while corresponding ASN.1 data types appear on the right. For example, in Table 3 showing the ASN.1 encoding of an LPPe Request Assistance Data message, the first optional ASN.1 parameter in the message is the commonIEsRequestAssistanceData parameter whose data type has the identity OMA-LPPe-CommonIEsRequestAssistanceData. The data type defines the content and encoding of the parameter and is defined elsewhere in the LPPe 2.0 TS (not shown here). Note that some common message header content (that can be common to all of or some subset of LPPe messages) is omitted from Tables 3-6 for simplicity.

TABLE 3

```
OMA-LPPe-RequestAssistanceData ::= SEQUENCE {
    commonIEsRequestAssistanceData  OMA-LPPe-CommonIEsRequestAssistanceData     OPTIONAL,
    agnss-RequestAssistanceData     OMA-LPPe-AGNSS-RequestAssistanceData        OPTIONAL,
    otdoa-RequestAssistanceData     OMA-LPPe-OTDOA-RequestAssistanceData        OPTIONAL,
    eotd-RequestAssistanceData      OMA-LPPe-EOTD-RequestAssistanceData         OPTIONAL,
    otdoa-utra-RequestAssistanceData OMA-LPPe-OTDOA-UTRA-RequestAssistanceData  OPTIONAL,
    ecid-lte-RequestAssistanceData  OMA-LPPe-ECID-LTE-RequestAssistanceData     OPTIONAL,
    ecid-gsm-RequestAssistanceData  OMA-LPPe-ECID-GSM-RequestAssistanceData     OPTIONAL,
    ecid-utra-RequestAssistanceData OMA-LPPe-ECID-UTRA-RequestAssistanceData    OPTIONAL,
    wlan-ap-RequestAssistanceData   OMA-LPPe-WLAN-AP-RequestAssistanceData      OPTIONAL,
    sensor-RequestAssistanceData    OMA-LPPe-Sensor-RequestAssistanceData       OPTIONAL,
    srn-RequestAssistanceData       OMA-LPPe-SRN-RequestAssistanceData          OPTIONAL,
    ...,
-- version 2.0 extension elements
    ver2-0-pdr-RequestAssistanceData OMA-LPPe-ver2-0-PDR-RequestAssistanceData  OPTIONAL,
    ver2-0-irb-RequestAssistanceData OMA-LPPe-ver2-0-IRB-RequestAssistanceData  OPTIONAL
}
```

TABLE 4

```
OMA-LPPe-ProvideAssistanceData ::= SEQUENCE {
    commonIEsProvideAssistanceData  OMA-LPPe-CommonIEsProvideAssistanceData     OPTIONAL,
    agnss-ProvideAssistanceData     OMA-LPPe-AGNSS-ProvideAssistanceData        OPTIONAL,
    otdoa-ProvideAssistanceData     OMA-LPPe-OTDOA-ProvideAssistanceData        OPTIONAL,
    eotd-ProvideAssistanceData      OMA-LPPe-EOTD-ProvideAssistanceData         OPTIONAL,
    otdoa-utra-ProvideAssistanceData OMA-LPPe-OTDOA-UTRA-ProvideAssistanceData  OPTIONAL,
    ecid-lte-ProvideAssistanceData  OMA-LPPe-ECID-LTE-ProvideAssistanceData     OPTIONAL,
    ecid-gsm-ProvideAssistanceData  OMA-LPPe-ECID-GSM-ProvideAssistanceData     OPTIONAL,
    ecid-utra-ProvideAssistanceData OMA-LPPe-ECID-UTRA-ProvideAssistanceData    OPTIONAL,
    wlan-ap-ProvideAssistanceData   OMA-LPPe-WLAN-AP-ProvideAssistanceData      OPTIONAL,
    sensor-ProvideAssistanceData    OMA-LPPe-Sensor-ProvideAssistanceData       OPTIONAL,
    srn-ProvideAssistanceData       OMA-LPPe-SRN-ProvideAssistanceData          OPTIONAL,
    ...,
-- version 2.0 extension elements
    ver2-0-pdr-ProvideAssistanceData OMA-LPPe-ver2-0-PDR-ProvideAssistanceData  OPTIONAL,
    ver2-0-irb-ProvideAssistanceData OMA-LPPe-ver2-0-IRB-ProvideAssistanceData  OPTIONAL
}
```

TABLE 5

```
OMA-LPPe-RequestLocationInformation ::= SEQUENCE {
    commonIEsRequestLocationInformation  OMA-LPPe-CommonIEsRequestLocationInformation    OPTIONAL,
    agnss-RequestLocationInformation     OMA-LPPe-AGNSS-RequestLocationInformation       OPTIONAL,
    otdoa-RequestLocationInformation     OMA-LPPe-OTDOA-RequestLocationInformation       OPTIONAL,
    eotd-RequestLocationInformation      OMA-LPPe-EOTD-RequestLocationInformation        OPTIONAL,
    otdoa-utra-RequestLocationInformation OMA-LPPe-OTDOA-UTRA-RequestLocationInfomation  OPTIONAL,
    ecid-lte-RequestLocationInformation  OMA-LPPe-ECID-LTE-RequestLocationInformation    OPTIONAL,
    ecid-gsm-RequestLocationInformation  OMA-LPPe-ECID-GSM-RequestLocationInformation    OPTIONAL,
    ecid-utra-RequestLocationInformation OMA-LPPe-ECID-UTRA-RequestLocationInformation   OPTIONAL,
    wlan-ap-RequestLocationInformation   OMA-LPPe-WLAN-AP-RequestLocationInformation     OPTIONAL,
```

TABLE 5-continued

```
    ecid-wimax-RequestLocationInformation     OMA-LPPe-ECID-WiMax-RequestLocationInformation     OPTIONAL,
    sensor-RequestLocationInformation         OMA-LPPe-Sensor-RequestLocationInformation         OPTIONAL,
    srn-RequestLocationInformation            OMA-LPPe-SRN-RequestLocationInfomation             OPTIONAL,
    ...,
-- version 2.0 extension element
    ver2-0-irb-RequestLocationInformation     OMA-LPPe-ver2-0-IRB-RequestLocationInformation     OPTIONAL,
    ver2-0-pdr-RequestLocationInformation     OMA-LPPe-ver2-0-PDR-RequestLocationInformation     OPTIONAL,
    ver2-0-crowdsourcing-RequestLocationInfomation    OMA-LPPe-ver2-0-Crowdsourcing-RequestLocationInfonnation
    OPTIONAL
}
```

TABLE 6

```
OMA-LPPe-ProvideLocationInformation ::= SEQUENCE {
    commonIEsProvideLocationInformation    OMA-LPPe-CommonIEsProvideLocationInformation    OPTIONAL,
    agnss-ProvideLocationInformation       OMA-LPPe-AGNSS-ProvideLocationInformation       OPTIONAL,
    otdoa-ProvideLocationInformation       OMA-LPPe-OTDOA-ProvideLocationInformation       OPTIONAL,
    eotd-ProvideLocationInformation        OMA-LPPe-EOTD-ProvideLocationInformation        OPTIONAL,
    otdoa-utra-ProvideLocationInformation  OMA-LPPe-OTDOA-UTRA-ProvideLocationInformation  OPTIONAL,
    ecid-lte-ProvideLocationInformation    OMA-LPPe-ECID-LTE-ProvideLocationInformation    OPTIONAL,
    ecid-gsm-ProvideLocationInformation    OMA-LPPe-ECID-GSM-ProvideLocationInformation    OPTIONAL,
    ecid-utra-ProvideLocationInformation   OMA-LPPe-ECID-UTRA-ProvideLocationInformation   OPTIONAL,
    wlan-ap-ProvideLocationInformastion    OMA-LPPe-WLAN-AP-ProvideLocationInformation     OPTIONAL,
    ecid-wimax-ProvideLocationInformastionOMA-LPPe-ECID-WiMax-ProvideLocationInformation   OPTIONAL,
    sensor-ProvideLocationInformation      OMA-LPPe-Sensor-ProvideLocationInformation      OPTIONAL,
    srn-ProvideLocationInformation         OMA-LPPe-SRN-ProvideLocationInformation         OPTIONAL,
    ...,
-- version 2.0 extension element
    ver2-0-irb-ProvideLocationInfomation   OMA-LPPe-ver2-0-IRB-ProvideLocationInformation  OPTIONAL,
    ver2-0-pdr-ProvideLocationInformation  OMA-LPPe-ver2-0-PDR-ProvideLocationInformation  OPTIONAL,
    ver2-0-crowdsourcing-ProvideLocationInformation    OMA-LPPe-ver2-0-Crowdsourcing-ProvideLocationInformation
    OPTIONAL
}
```

The message encodings shown in Tables 3-6 encode each LPPe message as an ASN.1 sequence of optional parameters, where each optional parameter may or may not be present in a particular LPPe message corresponding to the defined LPPe message type and, if present, comprises information for one particular position method or one positioning function whose name or identity forms part of the parameter name. For example, for an LPPe Provide Assistance Data message whose encoding is shown in Table 4, the agnss-ProvideAssistanceData parameter may or may not be present and, when present, would include assistance data for the A-GNSS position method.

As described above, each LPPe message can contain separate parameters for each position method supported in the LPPe message and the encodings shown in Tables 3-6 show the ASN.1 encoding that is used to support these separate parameters, As an example, if an LPPe Provide Assistance Data message is sent by a location server (e.g. location server 120) to a target device (e.g. target device 104) containing assistance data for common positioning, A-GNSS and WLAN positioning but not for any other position methods, then the LPPe Provide Assistance Data message would contain the ASN.1 parameters that are shown in Table 4 that comprise the commonIEsProvideAssistanceData, agnss-ProvideAssistanceData and the wlan-ap-ProvideAssistanceData ASN.1 parameters but not other ASN.1 parameters (e.g. the otdoa-ProvideAssistanceData ASN.1 parameter would not be included).

The message encoding shown in Tables 3-6 for LPPe messages is similar to ASN.1 message encoding used for other positioning protocols such as LPP and RRLP. As described earlier, a positioning protocol message can include separate parameters for each position method or positioning function supported in the message with the parameters encoded as a sequence of optional ASN.1 parameters as illustrated and described here for LPPe in Tables 3-6. A problem with this method of encoding is that the receiver of a positioning protocol message may need to decode the entire message including all parameters that are included in the message and including all content for each of these parameters. This may apply whether or not a receiver implements support for each position method for which a parameter is included in the received message. As an example, a target device (e.g. target device 104) that receives an LPPe Provide Assistance Data message from a location server (e.g. location server 120) that includes all the parameters allowed for the message as shown in Table 4 may need to decode all of the parameters in the message using an ASN.1 decoder and based on knowledge of the ASN.1 parameter encoding for an LPPe Provide Assistance Data message that is defined in the OMA LPPe 2.0 TS, a small part of which is shown in Table 4. This may apply even if the target device only supports a few or only one of the position methods for which assistance data is being provided in the LPPe Provide Assistance Data message. As an example, if the target device only supports WLAN positioning, the target device would need to decode the included parameters for other position methods (e.g. such as common positioning, A-GNSS, OTDOA etc.) as well as for WLAN positioning. Thus, in this example the target device may need to decode the following ASN.1 parameters shown in Table 4: commonIEsProvideAssistanceData, agnss-ProvideAssistanceData, otdoa-ProvideAssistanceData, eotd-ProvideAssistanceData, otdoa-utra-ProvideAssistance-Data, ecid-lte-ProvideAssistanceData, ecid-gsm-ProvideAssistanceData, ecid-utra-ProvideAssistanceData, wlan-ap-ProvideAssistanceData, sensor-ProvideAssistanceData, srn- ProvideAssistanceData and ver2-0-pdr-ProvideAssistanceData. Note that some implementations might not decode the ver2-0-pdr-ProvideAssistanceData parameter since this appears as an extension that is allowed to be ignored according to ASN.1 rules. Having decoded all the parameters (or nearly all the parameters) in this example, the target device may discard or ignore all decoded data for all position methods except the WLAN positioning method that is supported by the target device. The decoded assistance data for the WLAN positioning method (conveyed by the wlan-ap-ProvideAssistanceData ASN.1 parameter) could be retained by the target device for use in assisting WLAN positioning (e.g. for use in making measurements of signals from WLAN APs and/or in computing a location for the target device using such measurements).

The reason that a target device in the above example that only supports a few or one of the positioning methods supported in the received LPPe message may need to decode all (or nearly all) included parameters may be to verify that the LPPe message is coded correctly (e.g. does not contain ASN.1 errors that might invalidate the message) and to locate the bit sequences in the message that correspond to parameters for position methods that are supported by the target device. In this example, that means decoding the received LPPe message to enable the target device to identify whereabouts in the message the bit sequence is located that encodes the wlan-ap-ProvideAssistanceData for the supported WLAN positioning method. If the target device did not decode parameters in the received LPPe message corresponding to position methods that are not supported, the target device may not be able to locate the parameters in the message for position methods that are supported. This may be a consequence of using ASN.1 packed encoding rules (PER) in LPPe, (e.g. as defined in International Telecommunication Union (ITU) standard X.691), in which parameters within an ASN.1 sequence are encoded as bit strings that follow one another and do not contain length indications that would allow a receiver to skip over a non-supported parameter. Instead, a receiver may have to decode all or most bits for any parameter to determine whereabouts in the message the parameter ends and thereby whereabouts in the message the next parameter in the message begins.

The need to support decoding of potentially all or most parameters corresponding to different position methods and positioning functions in a positioning protocol message such as an LPPe message may be a significant impact to implementation of a receiving entity (e.g. a target device 104 or location server 120) in terms of the need to implement the decoding (e.g. compile a decoding template) and test that the decoding works correctly on different positioning protocol messages. In addition the decoding may consume processing resources in a receiving entity and may require memory to store a decoding template and store results of any decoding. Simplifying a positioning protocol such that implementation of decoding becomes less time consuming and decoding itself becomes less resource intensive could be an advantage.

To simplify decoding of positioning protocol messages, each of the separate parameters in any positioning protocol message may be defined as sequences of octets, bits, characters, integers or some other ASN.1 data type. Each of these sequences may then be defined to contain or embed the ASN.1 data type that was previously used to define the separate parameter. An example of this is shown in Tables 7 and 8 for the LPPe Provide Location Information message defined currently for LPP 2.0 as shown in Table 6. Tables 7 and 8 show new encodings for an LPPe Provide Location Information message wherein the ASN.1 parameters (for the different position methods that can be supported by this LPPe message) that are shown on the left remain as for the original message defined as shown in Table 6 but where the ASN.1 data types for each of the parameters (shown on the right) are each replaced by an ASN.1 octet string of variable length. Table 7 shows this data type replacement with no ASN.1 comments whereas Table 8 adds ASN.1 comments to the definition in Table 7 that shows the intended content for each of the octet strings defined on the line above each ASN.1 comment. Note that an ASN.1 comment starts with a double hyphen "--" and proceeds to the end of a line.

TABLE 7

```
OMA-LPPe-ProvideLocationInformation ::= SEQUENCE {
    commonIEsProvideLocationInformation        OCTET STRING    OPTIONAL,
    agnss-ProvideLocationInformation           OCTET STRING    OPTIONAL,
    otdoa-ProvideLocationInformation           OCTET STRING    OPTIONAL,
    eotd-ProvideLocationInformation            OCTET STRING    OPTIONAL,
    otdoa-utra-ProvideLocationInformation      OCTET STRING    OPTIONAL,
    ecid-lte-ProvideLocationInformation        OCTET STRING    OPTIONAL,
    ecid-gsm-ProvideLocationInformation        OCTET STRING    OPTIONAL,
    ecid-utra-ProvideLocationInformation       OCTET STRING    OPTIONAL,
    wlan-ap-ProvideLocationInformastion        OCTET STRING    OPTIONAL,
    ecid-wimax-ProvideLocationInformastion     OCTET STRING    OPTIONAL,
    sensor-ProvideLocationInformation          OCTET STRING    OPTIONAL,
    srn-ProvideLocationInformation             OCTET STRING    OPTIONAL,
    ...,
-- version 2.0 extension element
    ver2-0-irb-ProvideLocationInformation      OCTET STRING    OPTIONAL,
    ver2-0-pdr-ProvideLocationInformation      OCTET STRING    OPTIONAL,
    ver2-0-crowdsourcing-ProvideLocationInformation OCTET STRING   OPTIONAL
}
```

TABLE 8

```
OMA-LPPe-ProvideLocationInformation ::= SEQUENCE {
    commonIEsProvideLocationInformation        OCTET STRING    OPTIONAL,
        -- contains OMA-LPPe-CommonIEsProvideLocationInformation
```

TABLE 8-continued

```
    agnss-ProvideLocationInformation              OCTET STRING     OPTIONAL,
        -- contains OMA-LPPe-AGNSS-ProvideLocationInformation
    otdoa-ProvideLocationInformation              OCTET STRING     OPTIONAL,
        -- contains OMA-LPPe-OTDOA-ProvideLocationInformation
    eotd-ProvideLocationInformation               OCTET STRING     OPTIONAL,
        -- contains OMA-LPPe-EOTD-ProvideLocationInformation
    otdoa-utra-ProvideLocationInformation         OCTET STRING     OPTIONAL,
        -- contains OMA-LPPe-OTDOA-UTRA-ProvideLocationInformation
    ecid-lte-ProvideLocationInformation           OCTET STRING     OPTIONAL,
        -- contains OMA-LPPe-ECID-LTE-ProvideLocationInformation
    ecid-gsm-ProvideLocationInformation           OCTET STRING     OPTIONAL,
        -- contains OMA-LPPe-ECID-GSM-ProvideLocationInformation
    ecid-utra-ProvideLocationInformation          OCTET STRING     OPTIONAL,
        -- contains OMA-LPPe-ECID-UTRA-ProvideLocationInformation
    wlan-ap-ProvideLocationInformation            OCTET STRING     OPTIONAL,
        -- contains OMA-LPPe-WLAN-AP-ProvideLocationInformation
    ecid-wimax-ProvideLocationInformastion        OCTET STRING     OPTIONAL,
        -- contains OMA-LPPe-ECID-WiMax-ProvideLocationInformation
    sensor-ProvideLocationInformation             OCTET STRING     OPTIONAL,
        -- contains OMA-LPPe-Sensor-ProvideLocationInformation
    srn-ProvideLocationInformation                OCTET STRING     OPTIONAL,
        -- contains OMA-LPPe-SRN-ProvideLocationInformation
    ...,
-- version 2.0 extension element
    ver2-0-irb-ProvideLocationInformation         OCTET STRING     OPTIONAL,
        -- contains OMA-LPPe-ver2-0-IRB-ProvideLocationInformation
    ver2-0-pdr-ProvideLocationInformation         OCTET STRING     OPTIONAL,
        -- contains OMA-LPPe-ver2-0-PDR-ProvideLocationInformation
    ver2-0-crowdsourcing-ProvideLocationInformation OCTET STRING   OPTIONAL
        -- contains OMA-LPPe-ver2-0-Crowdsourcing-ProvideLocationInformation
}
```

As shown in Table 8, each parameter in an LPPe Provide Location Information message still contains the ASN.1 data type that was used to encode it according to Table 6, but this ASN.1 data type is now contained within an ASN.1 octet string. As an example, if the wlan-ap-ProvideLocationInformation parameter is present in an LPPe Provide Location Information message to convey measurements for the WLAN position method from a target device 104 to a location server 120, the parameter would normally be encoded as an OMA-LPPe-WLAN-AP-ProvideLocationInformation data type according to the normal definition for LPPe 2.0 shown in Table 6. With the new encoding shown in Tables 7 and 8, the wlan-ap-ProvideLocationInformation parameter would be encoded as a variable length ASN.1 octet string, but this octet string will contain the previous OMA-LPPe-WLAN-AP-ProvideLocationInformation data type which is now embedded inside the octet string as indicated by the ASN.1 comment for the wlan-ap-ProvideLocationInformation parameter in Table 8. With this definition, the wlan-ap-ProvideLocationInformation parameter is defined as an ASN.1 octet string that contains an embedded OMA-LPPe-WLAN-AP-ProvideLocationInformation data type conveying the same information as for the original encoding in Table 6. The embedding may typically consist of filling the entire octet string, or the entire octet string except for some final bits in the final octet, with an ASN.1 PER encoding for the ASN.1 OMA-LPPe-WLAN-AP-ProvideLocationInformation data type that is being embedded. The benefit of using an ASN.1 octet string to embed the detailed parameter content (e.g. the parameter content for an OMA-LPPe-WLAN-AP-ProvideLocationInformation data type in the previous example) is that a receiver that does not support WLAN positioning only needs to decode the ASN.1 octet string encoding for this parameter in order to know where the parameter ends in the message and where the next parameter (e.g. the ecid-wimax-ProvideLocationInformation parameter begins). The receiver does not need to decode the OMA-LPPe-WLAN-AP-ProvideLocationInformation data type embedded in the octet string unless the receiver supports WLAN positioning. Furthermore, each ASN.1 parameter that is defined for an LPPe message (now defined as an ASN.1 octet string containing an embedded ASN.1 data type corresponding to the particular position method associated with the octet string) may still be optionally included or excluded—e.g. may be absent in an LPPe message for which information for the associated position method is not included. Further, the position method associated with each ASN.1 parameter (e.g. as in Tables 7 and 8) is still identified (as before) by the name of the parameter (and by the name of the ASN.1 data type defined to be embedded in the octet string encoding of the parameter as in Table 8).

It will be apparent that the technique exemplified in Tables 7-8 can be applied to each of the other LPPe message types—e.g. those shown in Tables 3-5 and to messages for other positioning protocols such as LPP and RRLP that use a similar method of defining parameter content using ASN.1 for positioning protocol messages. Further, the simplified positioning protocol messages can be used in a similar or identical way to support or assist positioning as the original messages since the definition may only affect message encoding and may not change information content, positioning protocol procedures or position method support. Thus, for example, exemplary FIGS. 1-4 showing using usage of an arbitrary positioning protocol 130 in the case of FIG. 1 or LPP or LPP/LPPe in the case of FIGS. 2-4 remain valid when the associated positioning protocols are defined as described in association with FIGS. 7-8.

Note that parameters for different position methods and positioning functions may be encoded using ASN.1 data types other than an ASN.1 octet string. For example, encoding using an ASN.1 bit string, ASN.1 hexadecimal string, ASN.1 character sequence or ASN.1 sequence of integers may be used instead (e.g. in the case of the example in Tables 7-8). In these cases, other conventions may be used to perform the embedding. For example, in the case of a bit string, the embedding may typically consist of filling the whole bit string with an ASN.1 PER encoding for the ASN.1 data type that is being embedded. In the case of a character string, the embedding may consist of treating and encoding the character string as an octet string and performing embedding as for an octet string. In the case of a sequence of integers, a common range of values for each integer may be defined (e.g. the range 0 (zero) to 255) that allows a one to one mapping between integers and octets (e.g. by padding an integer value expressed in binary with additional binary zeroes in more significant bit positions if needed to create an octet and by doing the reverse to create an integer from an octet). An ASN.1 PER encoding for an ASN.1 data type can then be first embedded in an octet string which is then converted to an equivalent sequence of integers. In the case of a hexadecimal string, each hexadecimal digit may be treated and encoded as a half octet, enabling embedding similar to that for an octet string but based on embedding a sequence of half octets corresponding to the ASN.1 PER encoding for the data type being embedded.

Figures 5A, 5B:
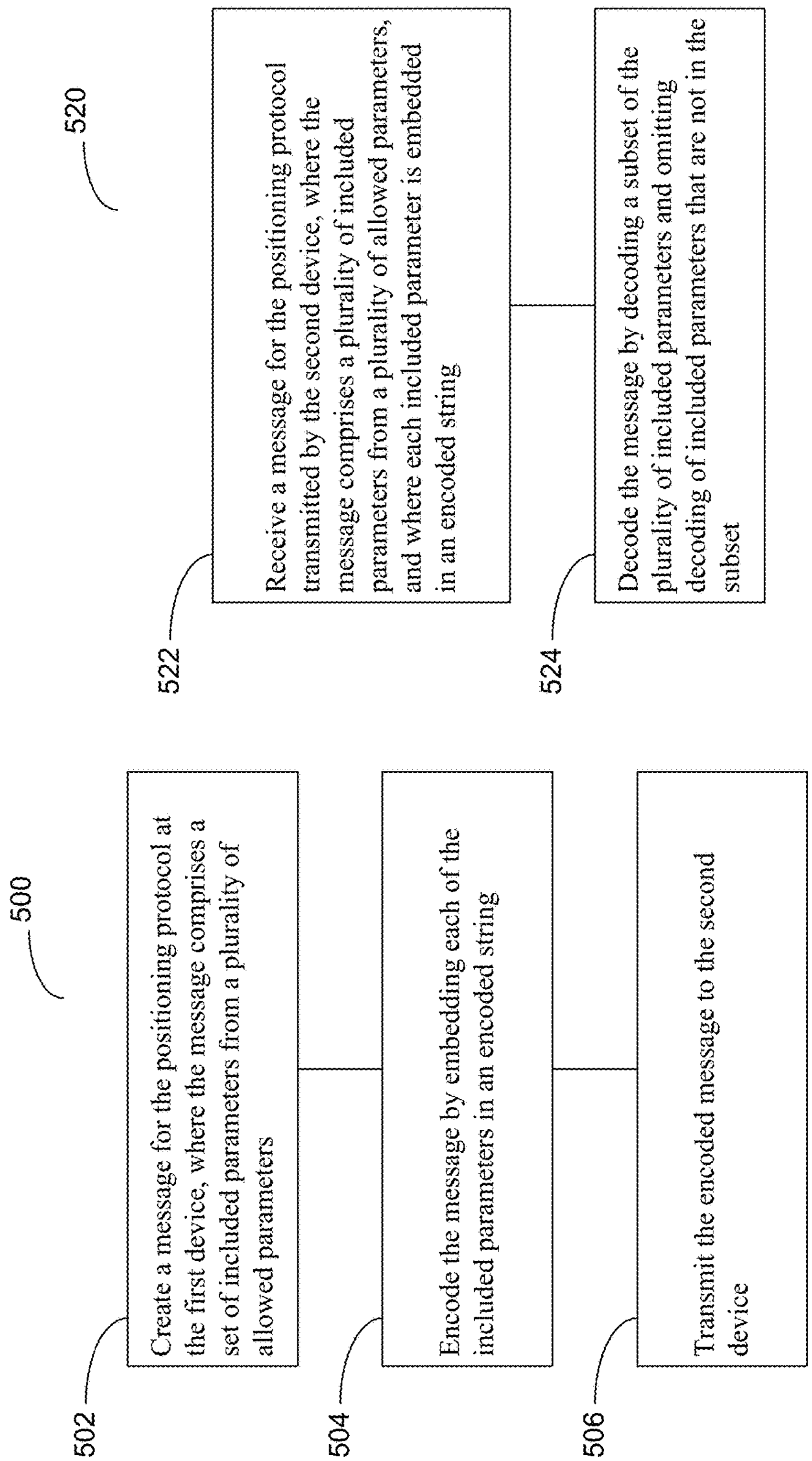
FIG. 5A-5B illustrate methods of supporting location services using a positioning protocol according to aspects of the present disclosure.

FIG. 5A illustrates an exemplary flow chart 500 for implementing methods of supporting location services using a positioning protocol between a first device and a second device according to aspects of the present disclosure. The first device may correspond to a UE (e.g. target device 104, target 302, target 402) and the second device may correspond to a location server (e.g. location server 120, server 304, control server 404, data server 406). Alternatively, the roles of the first and second devices may be reversed with the first device corresponding to a location server (e.g. location server 120, server 304, control server 404, data server 406) and the second device corresponding to a UE (e.g. target device 104, target 302, target 402). In block 502, the method creates a message for the positioning protocol at the first device, where the message comprises a set of included parameters from a plurality of allowed parameters. In block 504, the method encodes the message at the first device by embedding each of the included parameters in an encoded string. In block 506, the method transmits the encoded message from the first device to the second device.

As an example of flow chart 500, the positioning protocol may be LPPe and the message created at block 502 may correspond to the LPPe Provide Location Information message whose encoding and decoding were described previously in association with Tables 7 and 8. In this example, the plurality of allowed parameters at block 502 may correspond to the set of parameters shown in Tables 7 and 8 whose parameter names appear on the left and whose corresponding ASN.1 data types appear on the right. The set of included parameters at block 502 may then correspond to any subset of the allowed parameters. The encoded string at block 504 in which each included parameter is embedded may then correspond to the ASN.1 octet string shown as an ASN.1 data type for each parameter in Tables 7 and 8 and the embedding at block 504 may be as described previously for Tables 7 and 8. Transmission of the LPPe Provide Location Information message from the first device to the second device at block 506 may then be as described for any of steps 2, 3, 4, 7 for communication 300 or any of steps 2, 3, 4, 8 for communication 400.

According to aspects of the present disclosure, each of the plurality of allowed parameters at block 502 may correspond to a distinct position method or a distinct position function and each of the included parameters at block 502 may correspond to a position method or a position function that is supported by the first device. In the example provided by Tables 7 and 8, the distinct position methods and distinct position functions may correspond to the distinct position methods and distinct position functions for each of the parameters shown in Tables 7 and 8 that are indicated by the names of these parameters as described previously. The second device may support a subset of the position methods and position functions that correspond to the included parameters in block 502 and the second device may decode the included parameters corresponding to the subset of supported position methods and position functions and omit decoding of the included parameters corresponding to position methods and position functions that are not supported by the second device. As described previously, the second device may omit decoding of the included parameters corresponding to position methods and position functions that are not supported by the second device by decoding only the encoded string (e.g. an octet string in the example provided by Tables 7 and 8) in which each of these included parameters is embedded. The decoding of the encoded string may suffice, as described previously, to enable the second device to locate and decode the included parameters in block 502 corresponding to the subset of supported position methods and position functions.

In some implementations, the encoding of the message at block 504 is based on abstract syntax notation one (ASN.1)—e.g. as in Tables 7 and 8. The plurality of allowed parameters at block 502 may be defined in the message using at least one of an ASN.1 SEQUENCE (e.g. as in Tables 7 and 8) or an ASN.1 SET. The encoded string within which each included parameter is embedded at block 504 may comprise at least one of an ASN.1 octet string (e.g. as in Tables 7 and 8), an ASN.1 hexadecimal string, an ASN.1 character string, an ASN.1 bit string or an ASN.1 sequence of integers. The encoded strings in the message may all use the same ASN.1 data type (e.g. may all use an octet string as in Tables 7 and 8). Alternatively, the encoded strings in the message may use different ASN.1 data types: for example, the encoded string in which an included parameter corresponding to a first position method (e.g. A-GNSS) is embedded may be an ASN.1 octet string, whereas the encoded string in which an included parameter corresponding to a second position method (e.g. OTDOA) is embedded may be an ASN.1 bit string. Each encoded string can be an optional ASN.1 parameter in the message (e.g. as in Tables 7 and 8). Alternatively, one or more or all encoded strings may be mandatory ASN.1 parameters. In this case, the absence of an included parameter embedded in an encoded string may be indicated by including an encoded string of zero length or unitary length (e.g. containing zero octets or one octet, respectively, in the case of an encoded string that is an ASN.1 octet string). The positioning protocol may comprise the Long Term Evolution (LTE) Positioning Protocol (LPP) protocol, the LPP Extensions (LPPe) protocol (e.g. as in Tables 7 and 8) or a combination of LPP and LPPe. The first device may be a location server (e.g. a SUPL SLP or E-SMLC) and the second device may be a User Equipment (UE), or vice versa.

FIG. 5B illustrates another exemplary flow chart 520 for implementing methods of supporting location services using a positioning protocol between a first device and a second device according to aspects of the present disclosure. The first device may correspond to a UE (e.g. target device 104, target 302, target 402) and the second device may correspond to a location server (e.g. location server 120, server 304, control server 404, data server 406). Alternatively, the roles of the first and second devices may be reversed with the first device corresponding to a location server (e.g. location server 120, server 304, control server 404, data server 406) and the second device corresponding to a UE (e.g. target device 104, target 302, target 402). In block 522, and at the first device, the method receives a message for the positioning protocol transmitted by the second device, where the message comprises a plurality of included parameters from a plurality of allowed parameters, and where each included parameter is embedded in an encoded string. In block 524, the method decodes the message at the first device by decoding a subset of the plurality of included parameters and omitting decoding of included parameters that are not in the subset. The decoding of each included parameter may further comprise extracting the included parameter from the encoded string in which the included parameter is embedded.

As an example of flow chart 520, the positioning protocol may be LPPe and the message received at block 522 may correspond to the LPPe Provide Location Information message whose encoding and decoding were described previously in association with Tables 7 and 8. In this example, the plurality of allowed parameters at block 522 may correspond to the set of parameters shown in Tables 7 and 8 whose parameter names appear on the left and whose corresponding ASN.1 data types appear on the right. The plurality of included parameters at block 522 may then correspond to any subset of the plurality of allowed parameters. The encoded string at block 522 in which each included parameter is embedded may then correspond to the ASN.1 octet string shown as an ASN.1 data type for each parameter in Tables 7 and 8. At block 524, the first device may decode a subset of the plurality of included parameters and omit decoding of the other included parameters by decoding only the encoded string (e.g. an octet string in the example provided by Tables 7 and 8) in which each of these other included parameters is embedded. The decoding of the encoded string may suffice, as described previously, to enable the first device to locate and decode the subset of the plurality of included parameters in block 524.

According to aspects of the present disclosure, each of the plurality of allowed parameters at block 522 may correspond to a distinct position method or distinct position function (e.g. as exemplified by the parameters shown in Tables 7 and 8) and each of the plurality of included parameters at block 522 may correspond to a position method or a position function that is supported by the second device. The subset of the plurality of included parameters that are decoded by the first device at block 524 may correspond to position methods or position functions that are supported by the first device. The other included parameters that are not in this subset and whose decoding is omitted by the first device at block 524 may then correspond to position methods or position functions that are not supported by the first device. As described previously in association with Tables 7 and 8, the first device may not need to decode these other included parameters because decoding just the encoded string in which each of these other included parameters is embedded may suffice to locate and thereby decode the included parameters that are supported by the first device.

In some implementations, the decoding of the message at block 524 may be based on abstract syntax notation one (ASN.1)—e.g. as in the example of Tables 7 and 8. The plurality of allowed parameters at block 522 can be defined in the message using at least one of an ASN.1 SEQUENCE (e.g. as in Tables 7 and 8) or an ASN.1 SET. Each encoded string at block 522 may comprise at least one of an ASN.1 octet string (e.g. as in Tables 7 and 8), an ASN.1 hexadecimal string, an ASN.1 character string, an ASN.1 bit string or an ASN.1 sequence of integers. The encoded strings may all use the same ASN.1 data type (e.g. as in Tables 7 and 8). Alternatively, the encoded strings in the message may use different ASN.1 data types: for example, the encoded string in which an included parameter corresponding to a first position method (e.g. A-GNSS) is embedded may be an ASN.1 octet string, whereas the encoded string in which an included parameter corresponding to a second position method (e.g. OTDOA) is embedded may be an ASN.1 bit string. Each encoded string can be an optional ASN.1 parameter (e.g. as in Tables 7 and 8) or a mandatory ASN.1 parameter. In the case of a mandatory ASN.1 parameter, the absence of an included parameter embedded in an encoded string may be indicated by including an encoded string of zero length or unitary length (e.g. containing zero octets or one octet, respectively, in the case of an encoded string that is an ASN.1 octet string). The positioning protocol may comprise the Long Term Evolution (LTE) Position Protocol (LPP), the LPP Extensions (LPPe) protocol (e.g. as in Tables 7 and 8) or a combination of LPP and LPPe. The first device can be a location server and the second device can be a User Equipment (UE), or vice versa.

According to aspects of the present disclosure, a message for a positioning protocol used between two devices to support location services (e.g. obtaining a location estimate for a UE or providing assistance data to a UE to enable the UE to obtain its location) may be in the form shown in Table 9 which may use ASN.1 encoding. In some implementations, common information elements (e.g. information applicable to more than one position method) may be encoded in ENCODED-STRING-0; information (e.g. location measurements) for a first position method (e.g. A-GNSS) may be encoded in ENCODED-STRING-1; information (e.g. location measurements) for a second position method (e.g. OTDOA) may be encoded in ENCODED-STRING-2, and so on for other position methods with information (e.g. location measurements) for an $N^{th}$ position method (e.g. WLAN positioning) being encoded in ENCODED-STRING-N. Note that each encoded string (ENCODED-STRING-0, ENCODED-STRING-1 etc.) in the plurality of encoded strings defined in the message, as exemplified in Table 9, can have the same format (e.g. can each be an ASN.1 octet string in one example) or can have different formats (e.g. with some encoded strings being ASN.1 octet strings and other encoded strings being ASN.1 bit strings in one example). In some implementations, one or more of the encoded strings may be mandatory (e.g. ENCODED-STRING-0 in Table 9). In some implementations, all or some of the encoded strings may be optional (e.g. encoded strings other than ENCODED-STRING-0 in Table 9) with any optional encoded string only included in the message when a parameter corresponding to some position method or positioning function is embedded in the encoded string.

TABLE 9

```
ProvideLocationInformation ::= SEQUENCE {
commonIEsProvideLocationInformation          ENCODED-STRING-0,
positionMethod1-ProvideLocationInformation   ENCODED-STRING-1   OPTIONAL,
positionMethod2-ProvideLocationInformation   ENCODED-STRING-2   OPTIONAL,
positionMethod3-ProvideLocationInformation   ENCODED-STRING-3   OPTIONAL,
.
.
positionMethodN-ProvideLocationInformation   ENCODED-STRING-N   OPTIONAL
}
```

Note that the term "encoded string" as used above and the corresponding term "ENCODED-STRING-n" (e.g. n=0, 1, 2 . . . ) as used in Table 9 are intended to represent any one of several or many different parameter types—e.g. an octet string, bit string, hexadecimal string, or character string in the case of a message defined and encoded using ASN.1. Thus, an encoded string may correspond to any of a number of different parameter types and may then be replaced by the corresponding parameter type in any actual ASN.1 message definition. For example, if each of the encoded strings in Table 9 corresponds to an ASN.1 octet string, then in the actual message definition for which Table 9 is an illustration, each encoded string could be replaced by the term "OCTET STRING" (e.g. "ENCODED-STRING-2" in Table 9 would be replaced by the term "OCTET STRING"). As an alternative, each encoded string in the example of Table 9 could be replaced by the name of an ASN.1 data type that is defined separately (not shown in Table 9) and whose definition could, for example, include or comprise an octet string, bit string, hexadecimal string etc.

Tables 10 to 12 provide some examples of different types of encoded string when applied to the message example in Table 9. In Table 10, each encoded string is an ASN.1 octet string. In Table 11, each encoded string is an ASN.1 bit string. In Table 12, each encoded string is an ASN.1 character string. In each of Tables 10-12, each parameter remains mandatory or optional according to whether mandatory or optional, respectively, in Table 9.

TABLE 10

```
ProvideLocationInformation ::= SEQUENCE {
commonIEsProvideLocationInformation           OCTET STRING,
positionMethod1-ProvideLocationInformation    OCTET STRING    OPTIONAL,
positionMethod2-ProvideLocationInformation    OCTET STRING    OPTIONAL,
positionMethod3-ProvideLocationInformation    OCTET STRING    OPTIONAL,
.
.
positionMethodN-ProvideLocationInformation    OCTET STRING    OPTIONAL
}
```

TABLE 11

```
ProvideLocationInformation ::= SEQUENCE {
commonIEsProvideLocationInformation           CHARACTER STRING,
positionMethod1-ProvideLocationInformation    CHARACTER STRING   OPTIONAL,
positionMethod2-ProvideLocationInformation    CHARACTER STRING   OPTIONAL,
positionMethod3-ProvideLocationInformation    CHARACTER STRING   OPTIONAL,
.
.
positionMethodN-ProvideLocationInformation    CHARACTER STRING   OPTIONAL
}
```

TABLE 12

```
ProvideLocationInformation ::= SEQUENCE {
commonIEsProvideLocationInformation           BIT STRING,
positionMethod1-ProvideLocationInformation    BIT STRING      OPTIONAL,
positionMethod2-ProvideLocationInformation    BIT STRING      OPTIONAL,
positionMethod3-ProvideLocationInformation    BIT STRING      OPTIONAL,
.
.
positionMethodN-ProvideLocationInformation    BIT STRING      OPTIONAL
}
```

Note that other implementations may be used whereby parameters (or data types) encoding information for different position methods and/or different position functions may be embedded in simple data types such as an ASN.1 octet string, bit string or hexadecimal string as exemplified previously but with additional information identifying the data type that is embedded. For example, information for a particular position method or particular position function may be embedded in a data type (e.g. an ASN.1 octet string) together with an identification for the particular position method or particular position function. The identification may precede or succeed the embedded information for the particular position method or particular position function—e.g. may occupy the first octet or first few octets or the last octet or last few octets when information for a particular position method or particular position function is embedded in an ASN.1 octet string. The identification in this case may be a value (e.g. an octet value or binary value occupying more than one octet) that has been defined for the positioning protocol to identify the particular position method or particular position function. Alternatively, the identification may be included using a separate data type (e.g. an ASN.1 enumerated data type) that is combined with an encoded string containing embedded information for the particular position method or particular position function represented by the identification. This implementation may enable a message to be defined and/or encoded in a more concise form than that exemplified in Tables 3-12 by using identical parameters to include information for different position methods and different position functions, An example of this implementation is shown in Table 13, in the case that the identification of each position method and position function forms part of the encoded string, and in Table 14, in the case that the identification of each position method and position function is contained in a separate data type.

TABLE 13

```
ProvideLocationInformation ::= SEQUENCE (SIZE (1..N)) OF OCTET STRING
```

TABLE 14

```
ProvideLocationInformation ::= SEQUENCE (SIZE (1..N)) OF SEQUENCE {
positionMethodIdentification          ENUMERATED {positionMethod1, positionMethod2,
positionMethod3,    , positionMethodN, ...},
positionMethod-ProvideLocationInformation          OCTET STRING
}
```

In the example shown in Table 13, a message for a positioning protocol is encoded as a sequence of octet strings, where the number of octet strings in the sequence can be between 1 and some number N (e.g. where N corresponds to the number of allowed position methods and position functions for the positioning protocol). Each octet string may contain information for any one position method or any one position function (e.g. A-GNSS, OTDOA, crowdsourcing). This information may be encoded as defined for the positioning protocol (e.g. using a data type in the case of ASN.1 that may include parameters and fields that are relevant to the particular position method or particular position function). The encoded information may then be embedded in any one of the octet strings along with an identification of the particular position method or particular position function (e.g. in the first octet, first few octets, last octet or last few octets of the octet string). A receiver of the message can then extract the identification of the particular position method or particular position function for which encoded information is included in each octet string (e.g. by extracting the first octet, first few octets, last octet or last few octets that contain the identification) and can determine whether the receiver supports the particular position method or particular position function from the extracted identification and knowledge (e.g. configured in the receiver) of which position methods and position functions the receiver supports. If the receiver supports the particular position method or particular position function, the receiver can extract the encoded information for the particular position method or particular position function from the rest of the octet string and can decode the information (e.g. based on configured knowledge of how the information was encoded). If the receiver does not support the particular position method or particular position function, the receiver need not extract and decode the encoded information for the particular position method or particular position function. The receiver thereby does not need to support decoding of encoded information for unsupported position methods and unsupported position functions.

In the example shown in Table 14, the identification of each position method and position function is no longer embedded within an octet string as in Table 13 but is encoded in a separate parameter (in this example the parameter with the name positionMethodIdentification that has an ASN.1 enumerated data type). This separate parameter is associated with the octet string that contains the encoded information for the identified position method or position function due to being part of the same ASN.1 SEQUENCE. The actions of a receiver of the message shown in Table 14 may be similar to or the same as those described above for a receiver of the message shown in Table 13 except that the receiver of the message shown in Table 14 may identify the position method or position function for which encoded information is embedded in some octet string by decoding the associated parameter (in this example the parameter with the name positionMethodIdentification). Similar examples to those shown in Tables 13 and 14 are possible using other types of encoded string instead of an octet string such as a bit string, hexadecimal string or character string.

When a positioning protocol supports the method exemplified in Tables 7-14 to encode and decode information for different position methods and position functions in messages for the positioning protocol, a sender or receiver (e.g. a UE or location server) that does not support certain position methods and/or certain position functions may not need to be configured with information related to the encoding and/or decoding of information for these unsupported position methods and position functions in messages for the positioning protocol. This lack of a need to configure such information may be made formally explicit in the definition of the positioning protocol by including the definition of the content and encoding of the information for each position method and each position function for the positioning protocol in a separate module. In the case of ASN.1 encoding, each module may correspond to an ASN.1 module that includes an explicit start indication, explicit end indication and a module name. In this case, for an entity (e.g. a UE 104 or location server 120) that does not support a particular position method or position function, the ASN.1 module in which information content and encoding for the unsupported position method or unsupported position function is contained may be ignored—e.g. may not be included in the design and implementation of the entity. This may simplify the implementation of the entity—e.g. may enable faster implementation and provision or dedication of fewer resources (e.g. memory and/or processing) within the entity.

Figure 6:
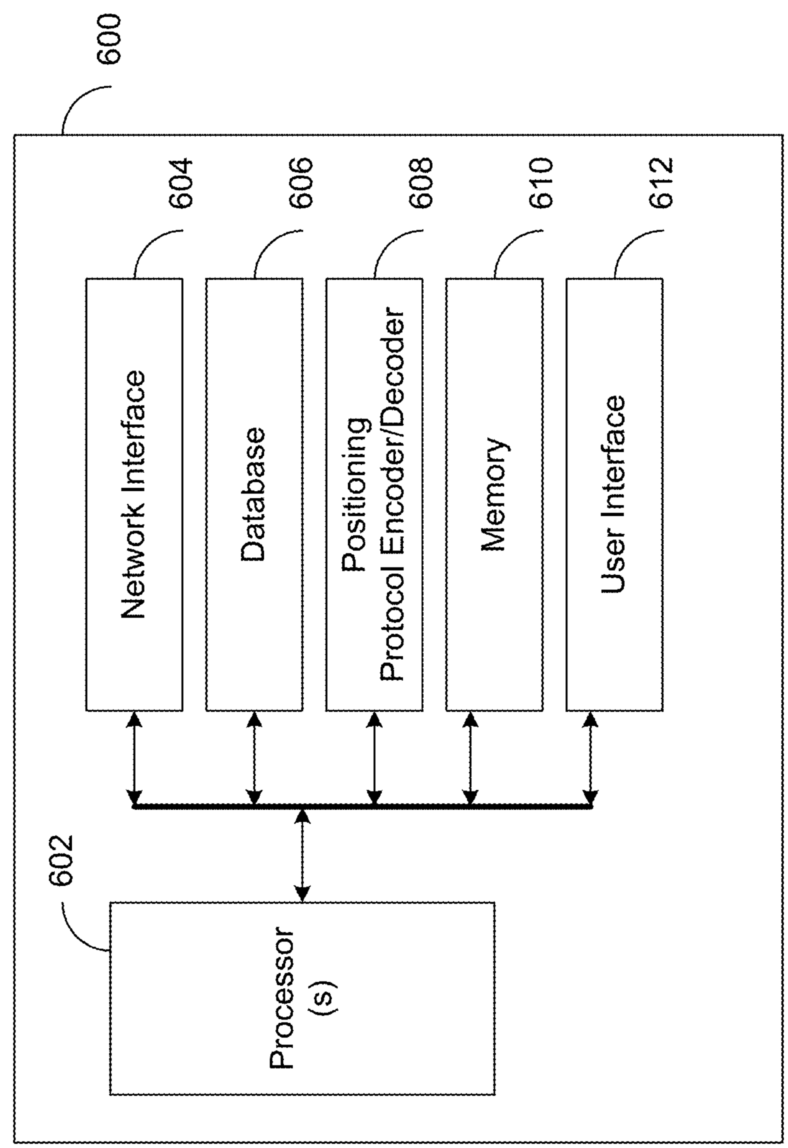
FIG. 6 illustrates an exemplary apparatus for supporting location services using a positioning protocol according to aspects of the present disclosure.

FIG. 6 illustrates an exemplary apparatus 600 for supporting location services using a positioning protocol such as positioning protocol 130 in FIG. 1 or the LPP, LPPe or LPP/LPPe positioning protocols exemplified in FIGS. 2-4 according to aspects of the present disclosure. Apparatus 600 may correspond to or represent any of target device 104, location server 120, endpoints 202 and 204, target 302 and 402 and/or server 304, 404 and 406. In the example shown in FIG. 6, apparatus 600 may include one or more processors 602, network interface 604, database 606, positioning protocol encoder/decoder module 608, memory 610, and user interface 612. The one or more processors 602 can be configured to control operations of the apparatus 600. The network interface 604 can be configured to communicate with a network (as described in association with FIG. 1) and with servers, computers, and/or mobile devices on the network or accessible via the network using one or more transceivers (transmitters and receivers) that may be part of network interface 604. Database 606 can be configured to store sensor measurements, user interface inputs, positioning estimations, images, encoding and decoding information and other information related to support of one or more positioning protocols. The one or more processors 602 and/or the positioning encoder/decoder module 608 can be configured to implement methods to support and communicate using one or more positioning protocols. For example, working with the processor(s) 602, the positioning protocol encoder/decoder module 608 can be configured to implement methods described in association with FIG. 1, FIGS. 2-4, FIGS. 5A-5B and Tables 7-14. In some implementations, encoder/decoder module 608 may include dedicated hardware whereas in other implementations encoder/decoder module 608 may be a process, program, part of a process or program or other software or firmware running on processor(s) 602 and possibly running according to code stored in memory 610.

Memory 610 can be configured to store program codes, instructions, and data for the apparatus 600—e.g. data to support message encoding and decoding according to the exemplary methods described here in association with Tables 7-14 and FIGS. 5A-5B. User interface 612 may be configured to enable interactions between apparatus 600 and a user. According to aspects of the present disclosure, the apparatus 600 may be implemented as a part of a server. In that implementation, the positioning protocols may be used by the server and/or may be communicated to mobile devices via the network interface 604. According to other aspects of the present disclosure, the apparatus 600 may be implemented as a part of a mobile device. In that implementation, the positioning protocols may be used by the mobile device and/or may be communicated to other mobile devices or servers via the network interface 604. In yet other implementations, some blocks of the apparatus 600 may be implemented in a mobile device and some blocks of the apparatus 600 may be in a server. These implementations or any combinations thereof are within the scope of the present disclosure.

Figure 7:
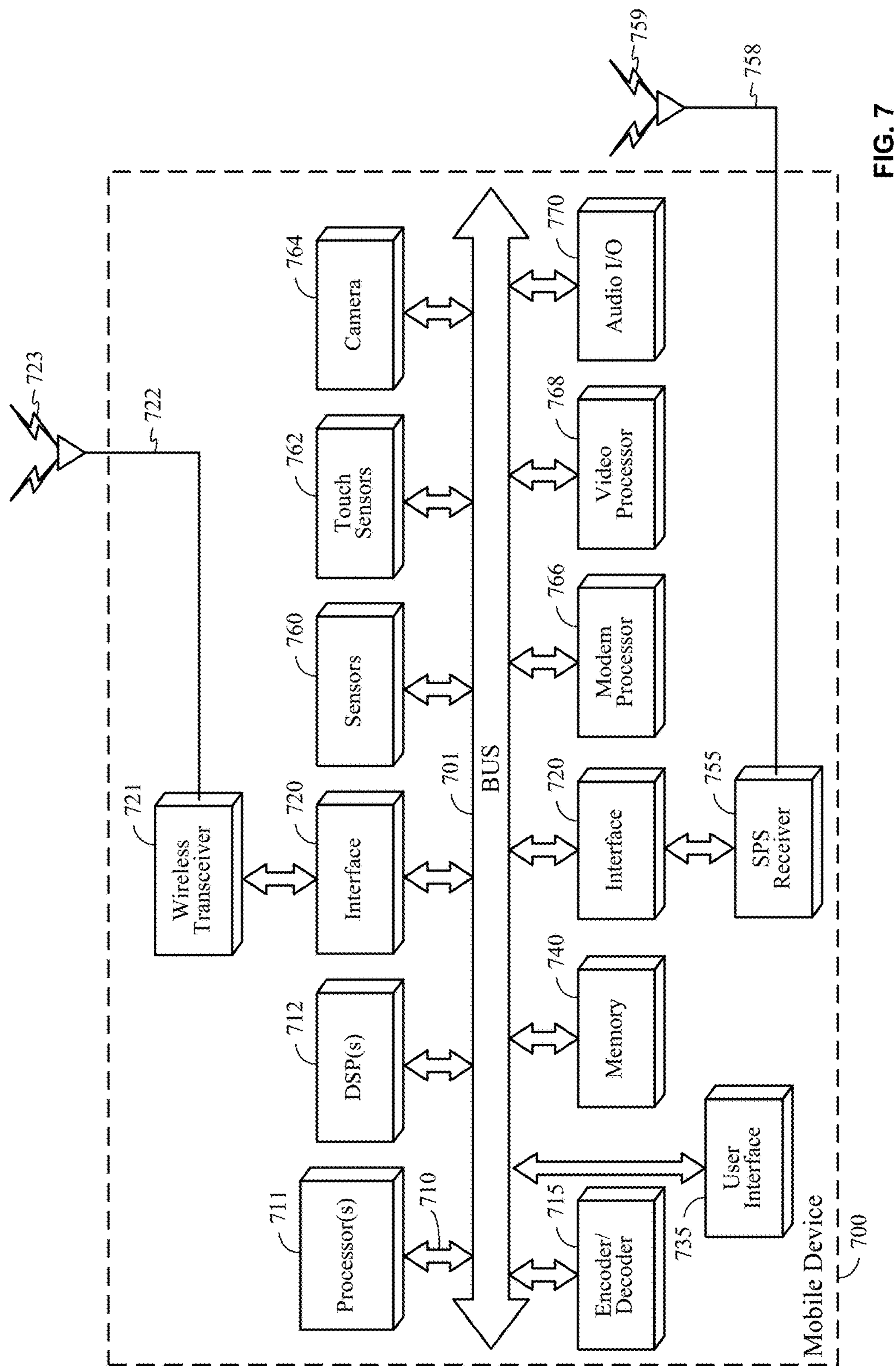
FIG. 7 illustrates an exemplary block diagram of a mobile device according to aspects of the present disclosure.

FIG. 7 illustrates an exemplary block diagram of a mobile device according to aspects of the present disclosure. As shown in FIG. 7, mobile device 700 may comprise one or more features of the one or more mobile devices as described in association with FIG. 1 to FIG. 6 (e.g. such as target device 104, target 302, target 402). In certain embodiments, mobile device 700 may include a wireless transceiver 721 which is capable of transmitting and receiving wireless signals 723 via wireless antenna(s) 722 over a wireless communication network such as network 118. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to corresponding multiple wireless communication standards such as, for example, versions of IEEE Std. 802.11, CDMA, WCDMA, LTE, UMTS, GSM, AMPS, Zigbee and Bluetooth®, etc.

According to aspects of the present disclosure, wireless transceiver 721 may comprise a transmitter and a receiver. The transmitter and the receiver may be implemented to share common circuitry, or may be implemented as separate circuits. Mobile device 700 may also comprise SPS receiver 755 capable of receiving and acquiring SPS signals 759 via SPS antenna 758. SPS receiver 755 may also process, in whole or in part, acquired SPS signals 759 for estimating a location of mobile device 700. In some embodiments, processor(s) 711, position protocol encoder/decoder 715, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals for use in performing positioning operations may be performed in memory 740 or registers (not shown).

Also shown in FIG. 7, mobile device 700 may comprise digital signal processor(s) (DSP(s)) 712 connected to the bus 701, processor(s) 711 connected to the bus 701 and memory 740. A bus interface may be integrated with the DSP(s) 712, processor(s) 711 and memory 740 or may be separate (not shown in FIG. 7). In various embodiments, functions may be performed in response to execution of one or more machine-readable instructions stored in memory 740 such as on a non-transitory computer-readable storage medium, such as RAM, ROM, FLASH, or disc drive, just to name a few example. The one or more instructions may be executable by processor(s) 711, specialized processors, or DSP(s) 712. The one or more instructions may enable support of the techniques described herein for a mobile device in association with FIGS. 5A-5B and Tables 7-14. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus interface 720 and bus 701 to enable mobile device 700 to be configured as a wireless mobile device as discussed above. Processor(s) 711, DSP(s) 712 and/or positioning protocol encoder/decoder 715 may execute instructions to execute one or more aspects of processes/methods discussed above in connection with FIG. 5A-5B. In an implementation, positioning protocol encoder/decoder 715 may correspond to (e.g. may perform the same or similar functions as) positioning protocol encoder/decoder 608 in apparatus 600.

Also shown in FIG. 7, a user interface 735 may comprise any one of several devices such as, for example, a speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display of mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) 712 or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or SPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Note that FIG. 1, FIG. 5A, FIG. 6, FIG. 7, Tables 7-14 and their corresponding descriptions provide means for creating a message for a positioning protocol at an apparatus, where the message comprises a set of included parameters from a plurality of allowed parameters; means for encoding the message by embedding each of the included parameters in an encoded string; and means for transmitting the encoded message to a second device.

Note that FIG. 1, FIG. 5B, FIG. 6, FIG. 7, Tables 7-14 and their corresponding descriptions provide means for receiving a message for a positioning protocol transmitted by a second device, where the message comprises a plurality of included parameters from a plurality of allowed parameters, and where each included parameter is embedded in an encoded string; means for decoding the message by decoding a subset of the plurality of included parameters and omitting decoding of included parameters that are not in the subset; and means for extracting an included parameter from the encoded string in which the included parameter is embedded.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, octets, integers, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, also known as a "small cell" or "home base station", utilized to extend cellular telephone service into a small area such as a business or home. In such an implementation, one or more mobile devices may communicate with a femtocell via a code division multiple access ("CDMA") cellular communication protocol or via LTE, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of space vehicles (SVs) for one or more GNSS systems and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of supporting location services using a positioning protocol between a first device and a second device, comprising:

determining a set of included parameters from a plurality of allowed parameters for the positioning protocol between the first device and the second device;

creating a message for the positioning protocol at the first device using the set of included parameters from the plurality of allowed parameters;

encoding the message by embedding each of the included parameters in an encoded string; and transmitting the encoded message to the second device, wherein the second device supports a subset of position methods and position functions that correspond to the included parameters and wherein the second device decodes the included parameters corresponding to the subset of supported position methods and position functions and omits decoding of the included parameters corresponding to position methods and position functions that are not supported by the second device, and wherein each of the plurality of allowed parameters corresponds to a distinct position method or a distinct position function and each of the included parameters corresponds to a position method or a position function that is supported by the first device.

2. The method of claim 1, wherein encoding the message is based on abstract syntax notation one (ASN.1).

3. The method of claim 2, wherein the plurality of allowed parameters is defined in the message using at least one of an ASN.1 SEQUENCE or an ASN.1 SET.

4. The method of claim 2, wherein the encoded string within which each included parameter is embedded comprises at least one of an ASN.1 octet string, an ASN.1 hexadecimal string, an ASN.1 character string, an ASN.1 bit string or an ASN.1 sequence of integers.

5. The method of claim 4, wherein the encoded strings use the same ASN.1 data type.

6. The method of claim 4, wherein each encoded string is an optional ASN.1 parameter.

7. The method of claim 1, wherein the positioning protocol comprises the Long Term Evolution (LTE) Positioning Protocol (LPP), the LPP Extensions (LPPe) protocol or a combination of LPP and LPPe.

8. The method of claim 1, wherein the first device is a location server and the second device is a User Equipment (UE), or vice versa.

9. An apparatus, comprising:

one or more processors configured to determine a set of included parameters from a plurality of allowed parameters for the positioning protocol between the first apparatus and a second device;

the one or more processors is further configured to create a message for a positioning protocol at the apparatus using the set of included parameters from the plurality of allowed parameters;

an encoder and/or the one or more processors to encode the message by embedding each of the included parameters in an encoded string; and a transmitter to transmit the encoded message to the second device wherein the second device supports a subset of position methods and position functions that correspond to the included parameters and wherein the second device decodes the included parameters corresponding to the subset of supported position methods and position functions and omits decoding of the included parameters corresponding to position methods and position functions that are not supported by the second device; and wherein each of the plurality of allowed parameters corresponds to a distinct position method or a distinct position function and each of the included parameters corresponds to a position method or a position function that is supported by the apparatus.

10. The apparatus of claim 9, wherein encoding the message is based on abstract syntax notation one (ASN.1).

11. The apparatus of claim 10, wherein the plurality of allowed parameters is defined in the message using at least one of an ASN.1 SEQUENCE or an ASN.1 SET.

12. The apparatus of claim 10, wherein the encoded string within which each included parameter is embedded comprises at least one of an ASN.1 octet string, an ASN.1 hexadecimal string, an ASN.1 character string, an ASN.1 bit string or an ASN.1 sequence of integers.

13. The apparatus of claim 10, wherein the encoded strings use the same ASN.1 data type.

14. The apparatus of claim 12, wherein each encoded string is an optional ASN.1 parameter.

15. The apparatus of claim 9, wherein the positioning protocol comprises the Long Term Evolution (LTE) Positioning Protocol (LPP), the LPP Extensions (LPPe) protocol or a combination of LPP and LPPe.

16. The apparatus of claim 9, wherein the apparatus is a location server and the second device is a User Equipment (UE), or vice versa.

17. A non-transitory medium storing instructions for execution by one or more computer systems, the instructions comprising:

instructions for determining a set of included parameters from a plurality of allowed parameters for the positioning protocol between a first device and a second device;

instructions for creating a message for the positioning protocol at the first device using the set of included parameters from the plurality of allowed parameters;

instructions for encoding the message by embedding each of the included parameters in an encoded string; and instructions for transmitting the encoded message to the second device, wherein the second device supports a subset of position methods and position functions that correspond to the included parameters and wherein the second device decodes the included parameters corresponding to the subset of supported position methods and position functions and omits decoding of the included parameters corresponding to position methods and position functions that are not supported by the second device, and wherein each of the plurality of allowed parameters corresponds to a distinct position method or a distinct position function and each of the included parameters corresponds to a position method or a position function that is supported by the first device.

* * * * *